United States Patent
Fang

(10) Patent No.: US 10,757,778 B2
(45) Date of Patent: Aug. 25, 2020

(54) SYSTEMS AND METHODS FOR OUTPUT CURRENT REGULATION IN POWER CONVERSION SYSTEMS

(71) Applicant: GUANGZHOU ON-BRIGHT ELECTRONICS CO., LTD., Guangzhou (CN)

(72) Inventor: Lieyi Fang, Shanghai (CN)

(73) Assignee: Guangzhou On-Bright Electronics Co., Ltd., Guangzhou (CN)

( * ) Notice: Subject to any disclaimer, the term of this patent is extended or adjusted under 35 U.S.C. 154(b) by 0 days.

(21) Appl. No.: 15/958,208

(22) Filed: Apr. 20, 2018

(65) Prior Publication Data
US 2018/0310373 A1    Oct. 25, 2018

Related U.S. Application Data

(63) Continuation of application No. 14/273,339, filed on May 8, 2014, now Pat. No. 9,986,605.

(30) Foreign Application Priority Data

Apr. 23, 2014   (CN) .......................... 2014 1 0166772

(51) Int. Cl.
*H05B 45/37* (2020.01)
*H05B 33/08* (2020.01)
(Continued)

(52) U.S. Cl.
CPC .............. *H05B 45/37* (2020.01); *G05F 1/00* (2013.01); *H02M 3/156* (2013.01); *H02M 3/158* (2013.01);
(Continued)

(58) Field of Classification Search
CPC ....................................................... G05F 1/00
See application file for complete search history.

(56) References Cited

U.S. PATENT DOCUMENTS 5,497,119 A   3/1996  Tedrow et al.
6,069,458 A   5/2000  Takehara et al.
(Continued)

FOREIGN PATENT DOCUMENTS

CN        1806381 A    7/2006
CN      101039075 A    9/2007
(Continued)

OTHER PUBLICATIONS

Chinese Patent Office, Office Action dated Apr. 24, 2014, in Application No. 201210099930.8.
(Continued)

*Primary Examiner* — Jue Zhang
*Assistant Examiner* — Trinh Q Dang
(74) *Attorney, Agent, or Firm* — Faegre Drinker Biddle & Reath LLP

(57) ABSTRACT

Systems and methods are provided for regulating a power conversion system. An example system controller includes: a detection component configured to receive an input voltage related to a diode connected to an inductor and output a first signal at a first logic level in response to the input voltage being larger than a predetermined threshold, a control logic component configured to receive the first signal, process information associated with the first signal, and output a modulation signal related to a modulation frequency in response to the first signal being at the first logic level, and a driving component configured to receive the modulation signal and output a drive signal to open and close a first switch at the modulation frequency.

8 Claims, 9 Drawing Sheets

(51) Int. Cl.
  *H02M 3/158* (2006.01)
  *H02M 3/335* (2006.01)
  *G05F 1/00* (2006.01)
  *H02M 3/156* (2006.01)
  *H02M 7/217* (2006.01)

(52) U.S. Cl.
  CPC ......... *H02M 3/1582* (2013.01); *H02M 3/335* (2013.01); *H05B 33/08* (2013.01); *H02M 7/2176* (2013.01); *Y02B 20/346* (2013.01); *Y02B 20/347* (2013.01)

(56) References Cited

U.S. PATENT DOCUMENTS

| | | |
|---|---|---|
| 6,977,824 B1 | 12/2005 | Yang et al. |
| 7,061,780 B2 | 6/2006 | Yang et al. |
| 7,394,634 B2 | 7/2008 | Fang et al. |
| 7,535,736 B2 | 5/2009 | Nakamura et al. |
| 7,869,229 B2 | 1/2011 | Huynh et al. |
| 7,898,187 B1 | 3/2011 | Mei et al. |
| 7,990,202 B2 | 8/2011 | Fang et al. |
| 8,013,544 B2 | 9/2011 | Negrete et al. |
| 8,093,826 B1 | 1/2012 | Eagar et al. |
| 8,144,487 B2 | 3/2012 | Djenguerian et al. |
| 8,391,028 B2 | 3/2013 | Yeh |
| 8,416,596 B2 | 4/2013 | Huang |
| 8,525,442 B2 | 9/2013 | Zimmermann et al. |
| 8,593,075 B1 | 11/2013 | Melanson et al. |
| 8,630,103 B2 | 1/2014 | Bäurle et al. |
| 8,664,883 B2 | 3/2014 | Hiramatu et al. |
| 8,824,173 B2 | 9/2014 | Fang et al. |
| 8,917,527 B2 | 12/2014 | Fang et al. |
| 9,084,317 B2 | 7/2015 | Fang et al. |
| 9,088,218 B2 | 7/2015 | Zhang et al. |
| 9,124,188 B2 | 9/2015 | Fang et al. |
| 9,148,061 B2 | 9/2015 | Fang et al. |
| 9,343,979 B2 | 5/2016 | Fang et al. |
| 9,531,278 B2 | 12/2016 | Zhang et al. |
| 9,794,997 B2 | 10/2017 | Fang et al. |
| 9,807,840 B2 | 10/2017 | Fang et al. |
| 9,812,970 B2 | 11/2017 | Fang et al. |
| 9,954,446 B2 | 4/2018 | Fang et al. |
| 9,986,605 B2 | 5/2018 | Fang |
| 10,003,271 B2 | 6/2018 | Fang et al. |
| 10,158,294 B2 | 12/2018 | Fang et al. |
| 10,205,395 B2 | 2/2019 | Zhang et al. |
| 10,277,132 B2 | 4/2019 | Zhang et al. |
| 10,314,130 B2 | 6/2019 | Fang et al. |
| 10,375,787 B2 | 8/2019 | Fang et al. |
| 2002/0080625 A1 | 6/2002 | Goyhenetche et al. |
| 2003/0174520 A1 | 9/2003 | Bimbaud |
| 2006/0113975 A1 | 6/2006 | Mednik et al. |
| 2006/0244429 A1 | 11/2006 | Quitayen |
| 2007/0120506 A1 | 5/2007 | Grant |
| 2008/0067993 A1 | 3/2008 | Coleman |
| 2008/0191679 A1 | 8/2008 | Williams |
| 2009/0051336 A1 | 2/2009 | Hartlieb et al. |
| 2009/0051340 A1 | 2/2009 | Wang |
| 2009/0091953 A1 | 4/2009 | Huynh et al. |
| 2009/0261758 A1 | 10/2009 | Ger |
| 2009/0273292 A1 | 11/2009 | Zimmermann |
| 2009/0284178 A1 | 11/2009 | Jessenig et al. |
| 2009/0289618 A1 | 11/2009 | Tajima et al. |
| 2010/0019682 A1 | 1/2010 | Lu et al. |
| 2010/0020573 A1 | 1/2010 | Melanson |
| 2010/0128501 A1 | 5/2010 | Huang et al. |
| 2010/0141178 A1 | 6/2010 | Negrete et al. |
| 2010/0238689 A1 | 9/2010 | Fei et al. |
| 2010/0308733 A1 | 12/2010 | Shao |
| 2010/0321956 A1 | 12/2010 | Yeh |
| 2011/0044076 A1 | 2/2011 | Zhang et al. |
| 2011/0096573 A1 | 4/2011 | Zhu et al. |
| 2011/0096574 A1 | 4/2011 | Huang |
| 2011/0148376 A1 | 6/2011 | Xu et al. |
| 2011/0254457 A1 | 10/2011 | Marent et al. |
| 2011/0267846 A1 | 11/2011 | Djenguerian et al. |
| 2011/0282704 A1 | 11/2011 | Graeber et al. |
| 2011/0292704 A1 | 12/2011 | Makino et al. |
| 2011/0316511 A1* | 12/2011 | Wang ............... H02M 3/156 323/285 |
| 2012/0008344 A1 | 1/2012 | Zeng et al. |
| 2012/0049758 A1 | 3/2012 | Hwang et al. |
| 2012/0049825 A1 | 3/2012 | Chen et al. |
| 2012/0075891 A1 | 3/2012 | Zhang et al. |
| 2012/0105030 A1 | 5/2012 | Chen et al. |
| 2012/0120342 A1 | 5/2012 | Uchimoto et al. |
| 2012/0146532 A1 | 6/2012 | Ivey et al. |
| 2012/0147630 A1 | 6/2012 | Cao et al. |
| 2012/0155122 A1 | 6/2012 | Tang et al. |
| 2012/0188670 A1* | 7/2012 | Lee ............... H02H 3/24 361/56 |
| 2012/0195076 A1 | 8/2012 | Zhang et al. |
| 2012/0217890 A1 | 8/2012 | Chang et al. |
| 2012/0281438 A1 | 11/2012 | Fang et al. |
| 2012/0320640 A1 | 12/2012 | Baurle et al. |
| 2013/0033905 A1 | 2/2013 | Lin et al. |
| 2013/0038227 A1 | 2/2013 | Yan et al. |
| 2013/0043849 A1 | 2/2013 | Pagano |
| 2013/0093356 A1 | 4/2013 | Green et al. |
| 2013/0114307 A1 | 5/2013 | Fang et al. |
| 2013/0119881 A1 | 5/2013 | Fang et al. |
| 2013/0147379 A1 | 6/2013 | Zhou et al. |
| 2013/0148387 A1 | 6/2013 | Ren et al. |
| 2013/0258723 A1 | 10/2013 | Fang et al. |
| 2013/0307431 A1 | 11/2013 | Zhu et al. |
| 2014/0029315 A1 | 1/2014 | Zhang et al. |
| 2014/0043879 A1 | 2/2014 | Eum et al. |
| 2014/0104895 A1 | 4/2014 | Baurle et al. |
| 2014/0140109 A1 | 5/2014 | Valley |
| 2014/0146578 A1 | 5/2014 | Fang et al. |
| 2014/0177280 A1 | 6/2014 | Yang et al. |
| 2015/0084530 A1 | 3/2015 | Kitamura et al. |
| 2015/0180347 A1 | 6/2015 | Fang et al. |
| 2015/0188441 A1 | 7/2015 | Fang et al. |
| 2015/0295494 A1 | 10/2015 | Gong |
| 2015/0311804 A1 | 10/2015 | Fang |
| 2015/0326130 A1 | 11/2015 | Zhang et al. |
| 2015/0334803 A1 | 11/2015 | Fang et al. |
| 2016/0028318 A1 | 1/2016 | Fang et al. |
| 2016/0276939 A1 | 9/2016 | Fang et al. |
| 2016/0278178 A1 | 9/2016 | Fang et al. |
| 2016/0285375 A1 | 9/2016 | Fang et al. |
| 2016/0329821 A1 | 11/2016 | Zhang et al. |
| 2017/0126137 A1 | 5/2017 | Zhang et al. |
| 2018/0042078 A1 | 2/2018 | Fang et al. |
| 2018/0042079 A1 | 2/2018 | Fang et al. |
| 2018/0076717 A1 | 3/2018 | Fang et al. |
| 2018/0124891 A1 | 5/2018 | Fang et al. |
| 2019/0191519 A1 | 6/2019 | Fang et al. |
| 2019/0327811 A1 | 10/2019 | Fang et al. |

FOREIGN PATENT DOCUMENTS

| | | |
|---|---|---|
| CN | 101056063 A | 10/2007 |
| CN | 101164384 A | 4/2008 |
| CN | 201087939 Y | 7/2008 |
| CN | 101248574 A | 8/2008 |
| CN | 101777848 A | 7/2010 |
| CN | 101835311 A | 9/2010 |
| CN | 1882214 B | 5/2011 |
| CN | 102055344 A | 5/2011 |
| CN | 102065602 A | 5/2011 |
| CN | 102076138 A | 5/2011 |
| CN | 102076149 A | 5/2011 |
| CN | 102083257 A | 6/2011 |
| CN | 102105010 A | 6/2011 |
| CN | 102158091 A | 8/2011 |
| CN | 102164439 A | 8/2011 |
| CN | 102185466 A | 9/2011 |
| CN | 102187736 A | 9/2011 |
| CN | 102202449 A | 9/2011 |
| CN | 102361402 A | 2/2012 |
| CN | 102437842 A | 5/2012 |
| CN | 102638165 A | 8/2012 |

(56) References Cited

FOREIGN PATENT DOCUMENTS

| | | |
|---|---|---|
| CN | 102651613 A | 8/2012 |
| CN | 102651935 A | 8/2012 |
| CN | 202435294 U | 9/2012 |
| CN | 103108437 | 5/2013 |
| CN | 103441660 A | 12/2013 |
| JP | 2011171231 | 9/2011 |
| TW | 185041 | 6/1992 |
| TW | 583817 | 4/2004 |
| TW | I 312914 | 8/2009 |
| TW | I 338994 | 3/2011 |
| TW | M412573 | 9/2011 |
| TW | 201134078 | 10/2011 |
| TW | I 357708 | 2/2012 |
| TW | 201218594 | 5/2012 |
| TW | 201249079 A | 12/2012 |
| TW | I 362170 | 12/2012 |
| TW | 201308842 A | 2/2013 |
| WO | WO 2007/041897 A1 | 4/2007 |

OTHER PUBLICATIONS

Chinese Patent Office, Office Action dated Apr. 3, 2014, in Application No. 201210258359.X.
Chinese Patent Office, Office Action dated May 14, 2014, in Application No. 201110123187.0.
Chinese Patent Office, Office Action dated Nov. 22, 2013, in Application No. 201110376439.0.
Chinese Patent Office, Office Action dated Apr. 15, 2015, in Application No. 201410053176.3.
Chinese Patent Office, Office Action dated Apr. 14, 2017, in Application No. 201510622975.2.
Chinese Patent Office, Office Action dated Oct. 10, 2017, in Application No. 201610177113.8.
Chinese Patent Office, Office Action dated Oct. 23, 2017, in Application No. 201610177276.6.
Chinese Patent Office, Office Action dated Dec. 25, 2017, in Application No. 201610177097.2.
Chinese Patent Office, Office Action dated Jul. 2, 2018, in Application No. 201610177276.6.
Liang et al., "Differential Detection Method of MOSFET Drain-source Voltage Valley Time," (Mar. 31, 2010).
Taiwanese Patent Office, Office Action dated Mar. 6, 2014, in Application No. 101102919.
Taiwanese Patent Office, Office Action dated Nov. 10, 2014, in Application No. 101118856.
Taiwanese Patent Office, Office Action dated Oct. 22, 2013, in Application No. 100120903.
Taiwanese Patent Office, Office Action dated Sep. 2, 2014, in Application No. 101144020.
Taiwanese Patent Office, Office Action dated Dec. 15, 2015, in Application No. 103140986.
United States Patent and Trademark Office, Office Action dated Mar. 22, 2017, in U.S. Appl. No. 15/152,362.
United States Patent and Trademark Office, Office Action dated Dec. 18, 2017, in U.S. Appl. No. 15/152,362.
United States Patent and Trademark Office, Notice of Allowance dated Jul. 6, 2018, in U.S. Appl. No. 15/152,362.
United States Patent and Trademark Office, Office Action dated Oct. 5, 2017, in U.S. Appl. No. 15/352,133.
United States Patent and Trademark Office, Notice of Allowance dated Jun. 22, 2018, in U.S. Appl. No. 15/352,133.
United States Patent and Trademark Office, Office Action dated Mar. 1, 2018, in U.S. Appl. No. 15/683,489.
United States Patent and Trademark Office, Notice of Allowance dated Feb. 12, 2018, in U.S. Appl. No. 15/707,184.
United States Patent and Trademark Office, Notice of Allowance dated Jun. 15, 2018, in U.S. Appl. No. 15/707,184.
United States Patent and Trademark Office, Notice of Allowance dated Aug. 9, 2018, in U.S. Appl. No. 15/683,402.
United States Patent and Trademark Office, Notice of Allowance dated Dec. 5, 2018, in U.S. Appl. No. 15/152,362.
United States Patent and Trademark Office, Notice of Allowance dated Sep. 20, 2018, in U.S. Appl. No. 15/352,133.
United States Patent and Trademark Office, Office Action dated Oct. 4, 2018, in U.S. Appl. No. 15/683,489.
United States Patent and Trademark Office, Notice of Allowance dated Jan. 8, 2019, in U.S. Appl. No. 15/683,402.
United States Patent and Trademark Office, Notice of Allowance dated Sep. 28, 2018, in U.S. Appl. No. 15/812,933.
United States Patent and Trademark Office, Office Action dated Jun. 27, 2019, in U.S. Appl. No. 5/683,489.
United States Patent and Trademark Office, Office Action dated Mar. 8, 2019, in U.S. Appl. No. 15/683,489.
United States Patent and Trademark Office, Notice of Allowance dated Nov. 20, 2019, in U.S. Appl. No. 15/683,489.
United States Patent and Trademark Office, Notice of Allowance dated Sep. 11, 2019, in U.S. Appl. No. 16/359,912.
United States Patent and Trademark Office, Notice of Allowance dated Jan. 17, 2020, in U.S. Appl. No. 16/222,032.
United States Patent and Trademark Office, Office Action dated Jun. 25, 2020, in U.S. Appl. No. 16/705,778.

* cited by examiner

SYSTEMS AND METHODS FOR OUTPUT CURRENT REGULATION IN POWER CONVERSION SYSTEMS

1. CROSS-REFERENCES TO RELATED APPLICATIONS

This application is a continuation of U.S. patent application Ser. No. 14/273,339, filed May 8, 2014, which claims priority to Chinese Patent Application No. 201410166772.2, filed Apr. 23, 2014, both of these applications being incorporated by reference herein for all purposes.

2. BACKGROUND OF THE INVENTION

Certain embodiments of the present invention are directed to integrated circuits. More particularly, some embodiments of the invention provide a system and method for output current regulation. Merely by way of example, some embodiments of the invention have been applied to power conversion systems. But it would be recognized that the invention has a much broader range of applicability.

FIG. 1 is a simplified diagram for a conventional buck power conversion system with primary-side sensing and regulation. The system 100 includes a system controller 102, resistors 118, 164, and 192, capacitors 108, 142, and 124, a power switch 130, an inductor 120, a diode 122, and LEDs 198. In addition, the system controller 102 includes terminals 140, 144, 146, 148 and 154.

An alternating-current (AC) input 110 (e.g., VAC) is provided to input terminals 112 and 114. For example, the system controller 102 receives an input signal related to the AC input 110 and generates a signal 194 to affect the switch 130. When the switch 130 is closed (e.g., being turned on), the inductor 120 is magnetized and a current 190 flows through the switch 130 and the resistor 164. A current sensing signal 106 is detected by the system controller 102 at the terminal 146 (e.g., terminal CS). When the switch 130 is open (e.g., being turned off), the inductor 120 is demagnetized, and a current 192 flows through the diode 122, the capacitor 124, and the LEDs 198. The output current 188 that flows through the LEDs 198 is approximately equal to an average current flowing through the inductor 120. If the average current flowing through the inductor 120 is regulated to a predetermined magnitude, the output current 188 that flows through the LEDs 198 is regulated to be approximately constant at a predetermined magnitude. For example, the output current 188 is estimated by sensing the current 190 through the resistor 164 and calculating a demagnetization period associated with the inductor 120. The terminal 148 is biased at a ground voltage 104. But the conventional power conversion system 100 has some disadvantages.

Hence, it is highly desirable to improve the technique for regulating output currents of power conversion systems.

3. BRIEF SUMMARY OF THE INVENTION

Certain embodiments of the present invention are directed to integrated circuits. More particularly, some embodiments of the invention provide a system and method for output current regulation. Merely by way of example, some embodiments of the invention have been applied to power conversion systems. But it would be recognized that the invention has a much broader range of applicability.

According to one embodiment, a system controller for regulating a power conversion system includes: a detection component configured to receive an input voltage related to a diode connected to an inductor and output a first signal at a first logic level in response to the input voltage being larger than a predetermined threshold; a control logic component configured to receive the first signal, process information associated with the first signal, and output a modulation signal related to a modulation frequency in response to the first signal being at the first logic level; and a driving component configured to receive the modulation signal and output a drive signal to open and close a first switch at the modulation frequency, so that in response to the first switch being closed, the inductor is configured to output a first current through the switch and in response to the first switch being open, the inductor is configured to output a second current through the diode.

According to another embodiment, a system controller for regulating a power conversion system includes: a first transistor including a first transistor terminal, a second transistor terminal, and a third transistor terminal, the first transistor terminal being coupled to a fourth transistor terminal of a second transistor, the second transistor further including a fifth transistor terminal and a sixth transistor terminal. The fifth transistor terminal is coupled to a first resistor terminal of a first resistor, the first resistor further including a second resistor terminal. The fifth transistor terminal is coupled to a first diode terminal of a first diode, the first diode further including a second diode terminal. The second diode terminal is coupled to the second resistor terminal. The system controller is configured to change a first voltage of the fourth transistor terminal to turn on and off the second transistor and to affect a current flowing through an inductor.

According to yet another embodiment, a system controller for regulating a power conversion system includes: a sampling component configured to detect one or more peak magnitudes of a current sensing signal associated with a first current from an inductor flowing through a switch and generate an output signal based on at least information associated with the detected one or more peak magnitudes of the current sensing signal; an error amplifier configured to receive the output signal and a reference signal and generate an amplified signal based on at least information associated with the output signal and the reference signal; a comparator configured to receive the current sensing signal and a first signal associated with the amplified signal and output a comparison signal based on at least information associated with the first signal and the current sensing signal; and a control-and-drive component configured to receive the comparison signal and output a drive signal based on at least information associated with the comparison signal to close or open the switch to affect the first current.

According to yet another embodiment, a system controller for regulating a power conversion system includes: a protection component configured to receive a first signal and a second signal and generate a third signal based on at least information associated with the first signal and the second signal, the first signal being associated with a demagnetization period related to an inductor, the second signal being associated with a first current flowing through the inductor; and a control-and-drive component configured to receive the third signal and output a drive signal to the switch to affect the first current. The protection component is further configured to, in response to, the second signal indicating, during a first switching cycle associated with the drive signal, that the first current is equal to or larger than a current threshold, and the first signal indicating, during an off-time period of the first switching cycle, that the demagnetization period is smaller than a predetermined time period, change the third signal from a first signal state to a second signal state to cause the power conversion system to be shut down.

In one embodiment, a method for regulating a power conversion system includes: receiving an input voltage related to a diode connected to an inductor; processing information associated with the input signal; outputting a first signal at a first logic level in response to the input voltage being larger than a predetermined threshold; receiving the first signal; and processing information associated with the first signal. The method further includes: outputting a modulation signal related to a modulation frequency in response to the first signal being at the first logic level; receiving the modulation signal; and processing information associated with the modulation signal. In addition, the method includes: outputting a drive signal to open and close a first switch at the modulation frequency; in response to the first switch being closed, outputting a first current through the switch; and in response to the first switch being open, outputting a second current through the diode.

In another embodiment, a method for regulating a power conversion system includes: sampling one or more peak magnitudes of a current sensing signal associated with a first current from an inductor flowing through a switch; generating an output signal based on at least information associated with the detected one or more peak magnitudes of the current sensing signal; receiving the output signal and a reference signal; and processing information associated with the output signal and the reference signal. The method further includes: generating an amplified signal based on at least information associated with the output signal and the reference signal; receiving the current sensing signal and a first signal associated with the amplified signal; processing information associated with the current sensing signal and the first signal; and outputting a comparison signal based on at least information associated with the first signal and the current sensing signal. Furthermore, the method includes: receiving the comparison signal; processing information associated with the comparison signal; and outputting a drive signal based on at least information associated with the comparison signal to close or open the switch to affect the first current.

In yet another embodiment, a method for regulating a power conversion system includes: receiving a first signal and a second signal; processing information associated with the first signal and the second signal; and generating a third signal based on at least information associated with the first signal and the second signal, the first signal being associated with a demagnetization period related to an inductor, the second signal being associated with a first current flowing through the inductor. The method further includes: receiving the third signal; processing information associated with the third signal; outputting a drive signal to the switch to affect the first current; and in response to, the second signal indicating, during a first switching cycle associated with the drive signal, that the first current is equal to or larger than a current threshold and the first signal indicating, during an off-time period of the first switching cycle, that the demagnetization period is smaller than a predetermined time period, changing the third signal from a first signal state to a second signal state to cause the power conversion system to be shut down.

Depending upon embodiment, one or more of these benefits may be achieved. These benefits and various additional objects, features and advantages of the present invention can be fully appreciated with reference to the detailed description and accompanying drawings that follow.

4. BRIEF DESCRIPTION OF THE DRAWINGS

Figure 1:
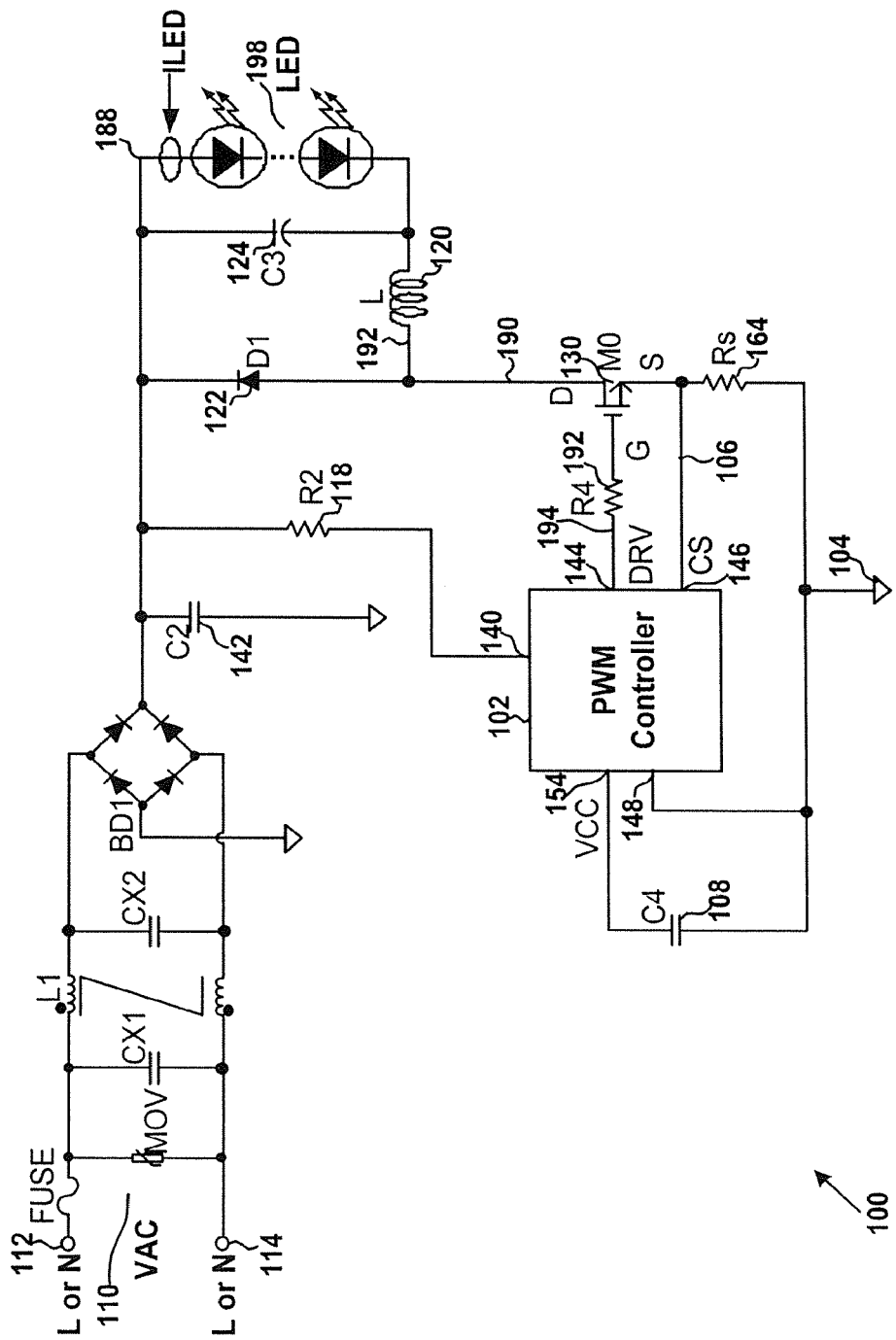
FIG. 1 is a simplified diagram for a conventional floating buck power conversion system with primary-side sensing and regulation.
Figure 2:
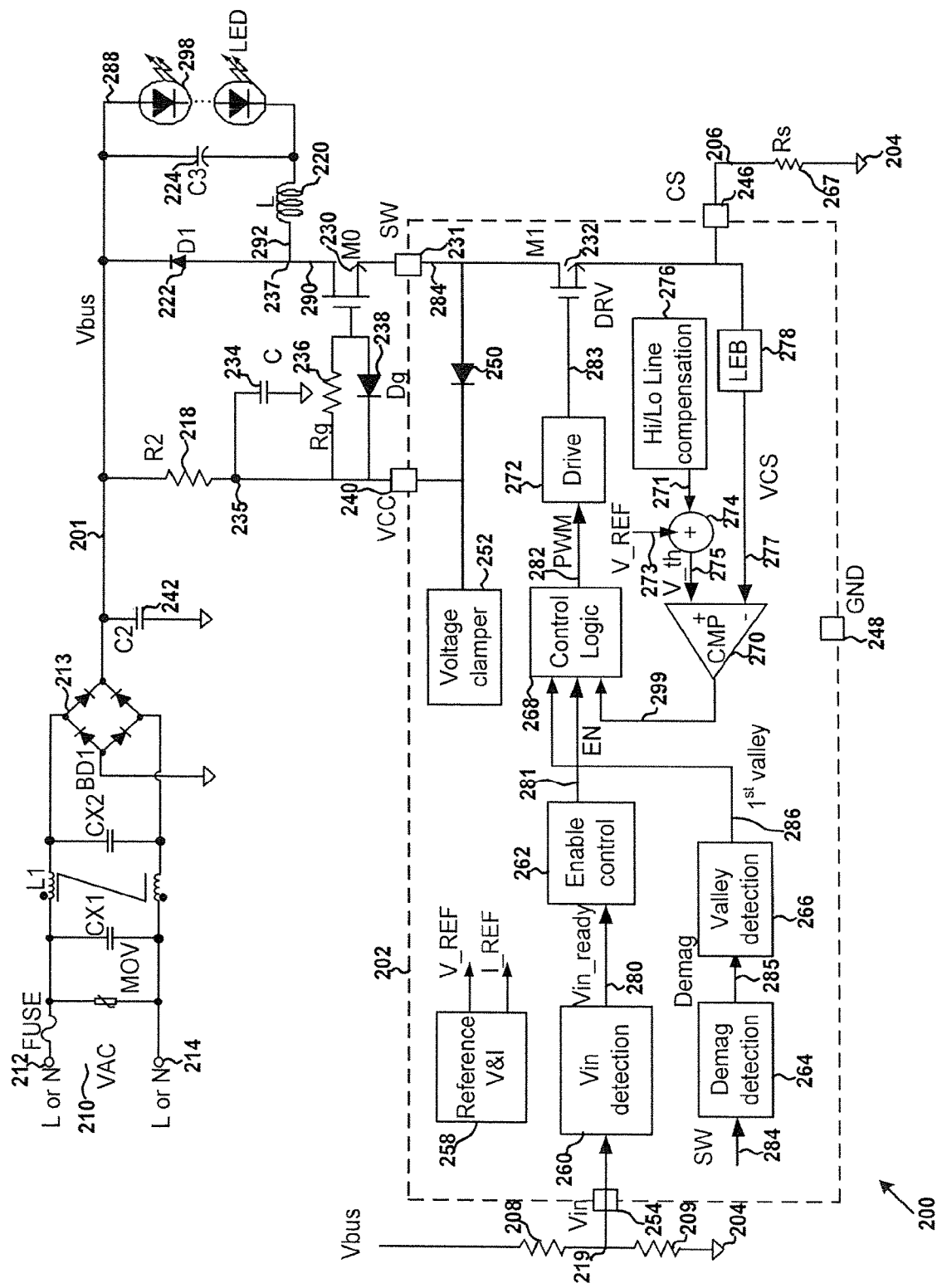
FIG. 2 is a simplified diagram showing a power conversion system according to an embodiment of the present invention.
Figure 4:
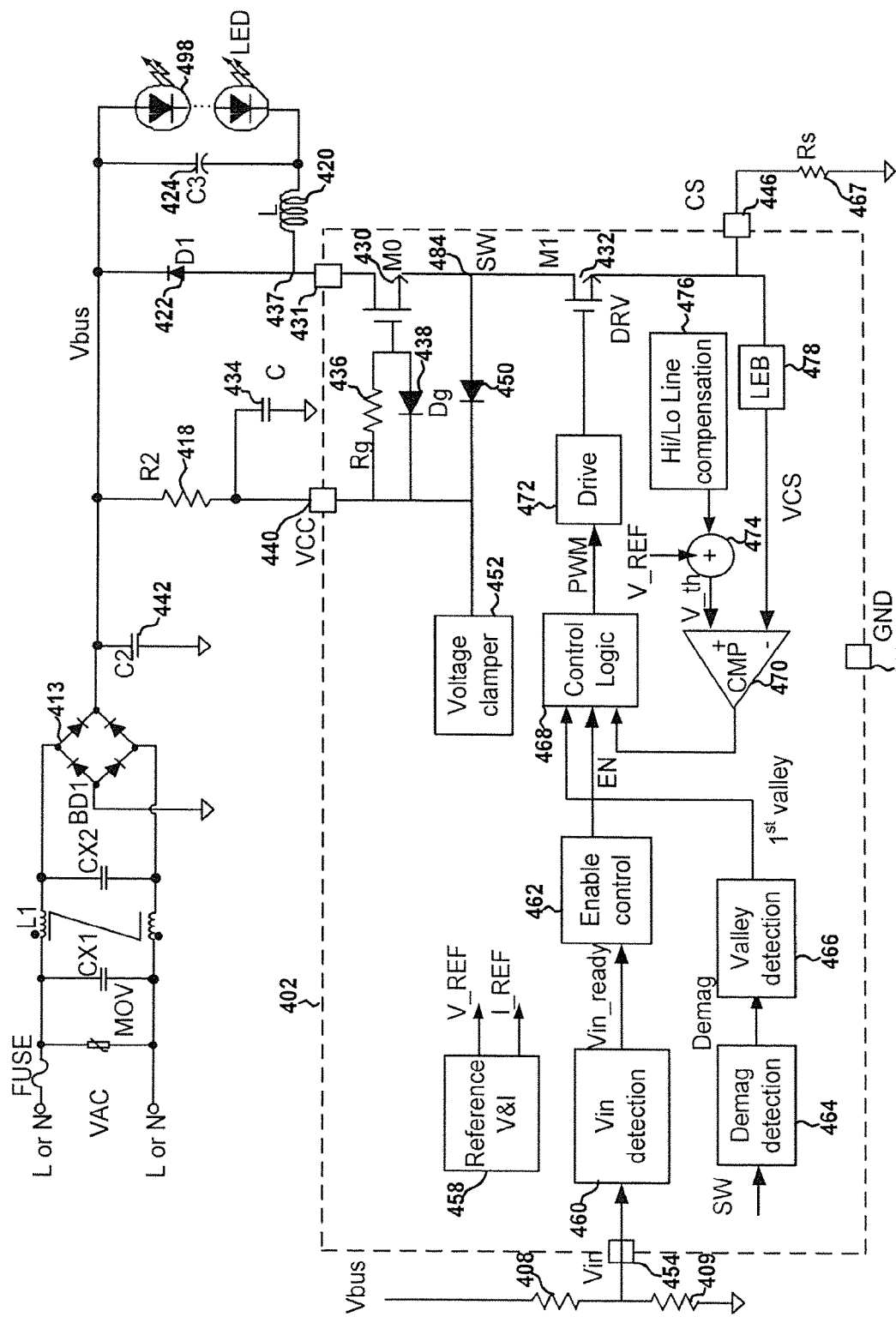
FIG. 4 is a simplified diagram showing a power conversion system according to another embodiment of the present invention.
Figure 6:
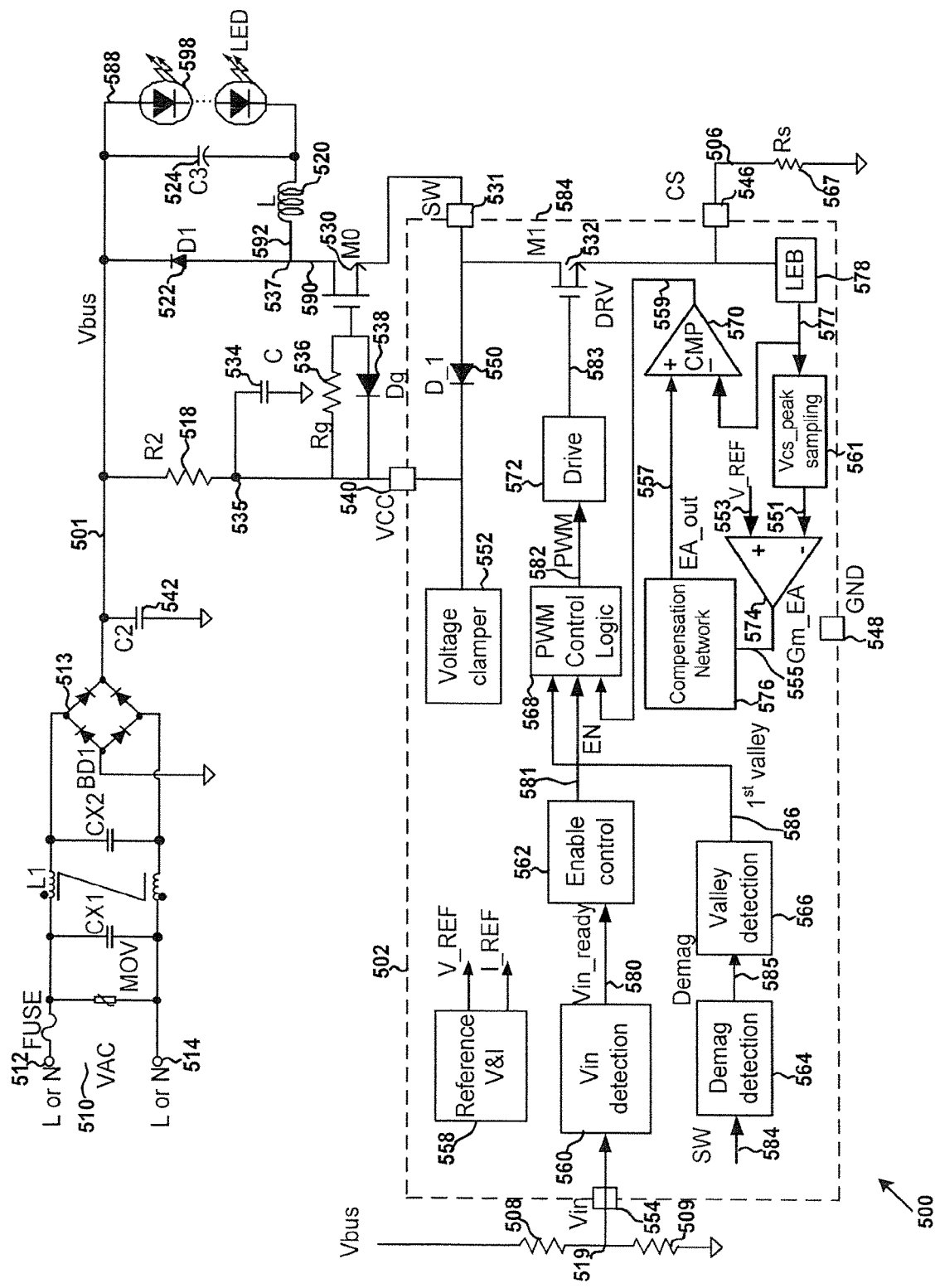
FIG. 6 is a simplified diagram showing a power conversion system according to yet another embodiment of the present invention.
Figure 7:
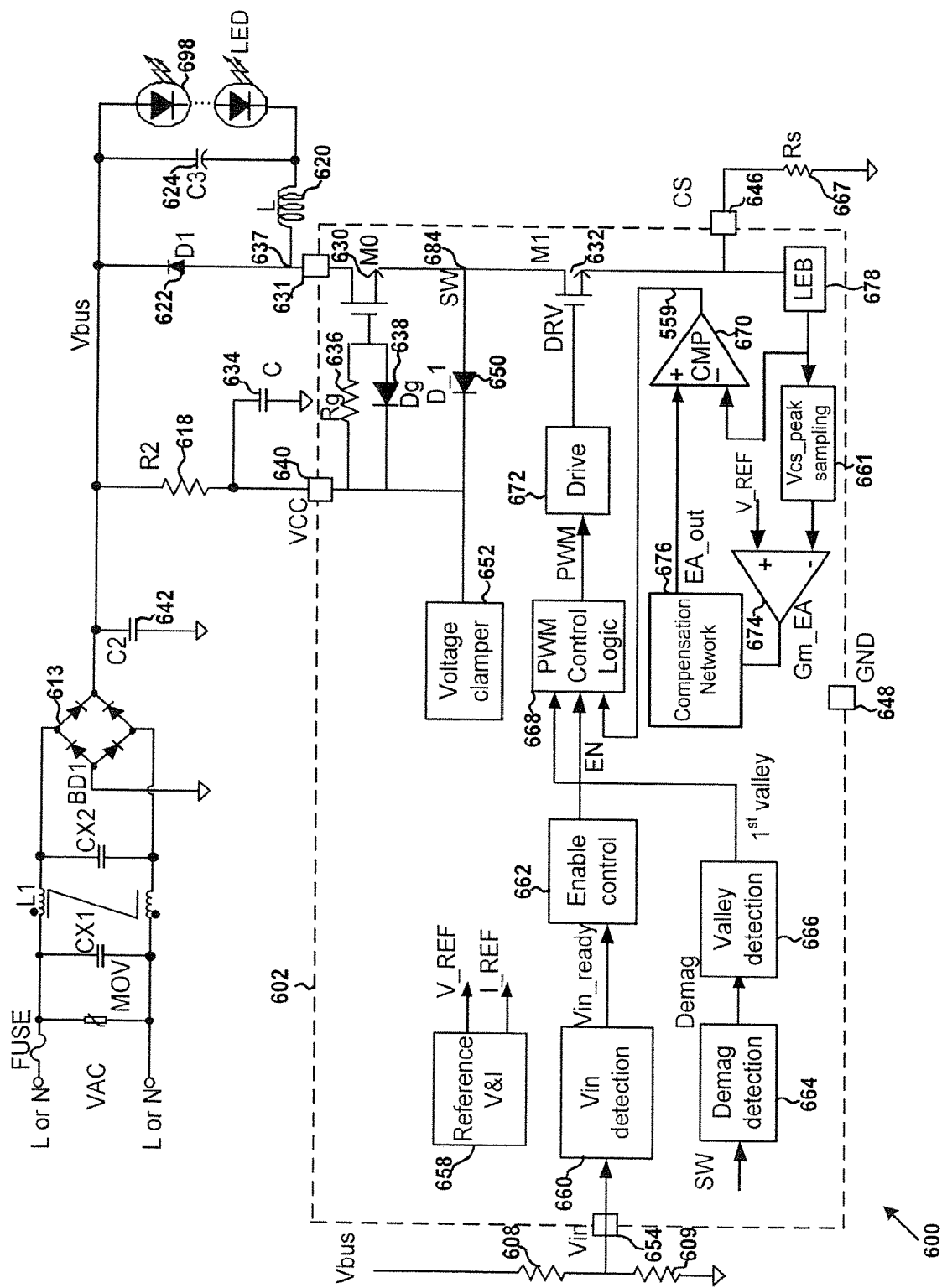
FIG. 7 is a simplified diagram showing a power conversion system according to yet another embodiment of the present invention.
Figure 9:
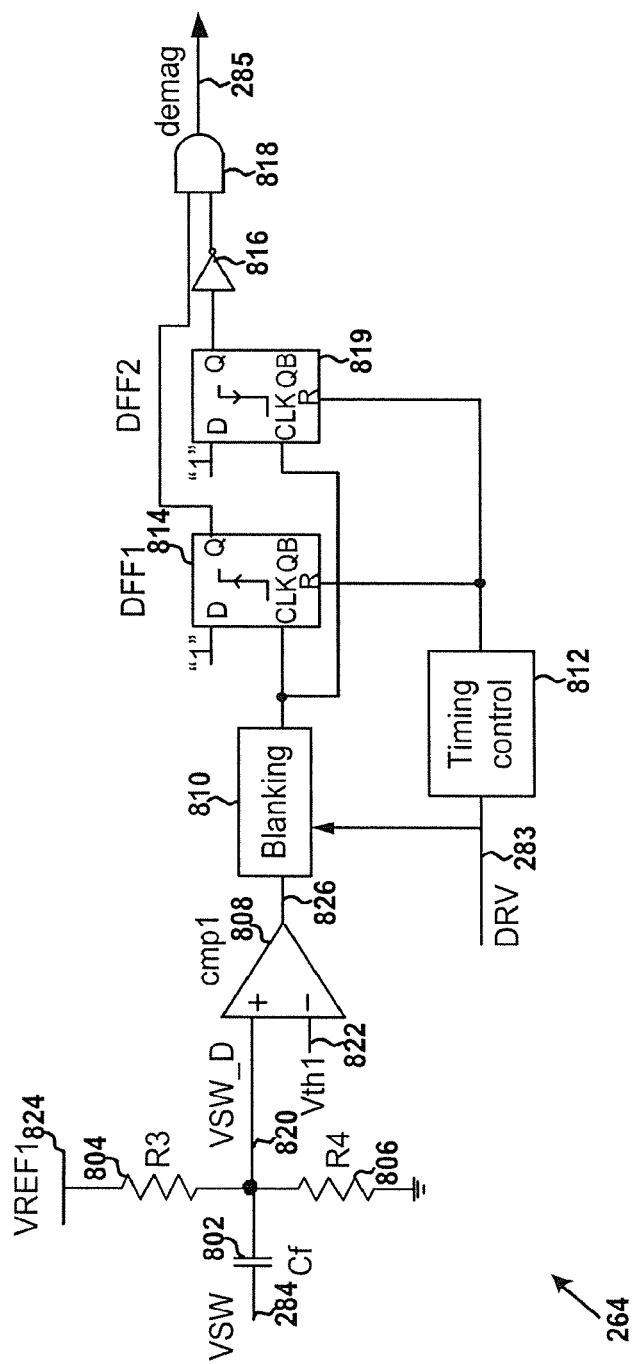

FIG. 9 is a simplified diagram showing certain components of a demagnetization detector as part of the power conversion system as shown in FIG. 2, certain components of a demagnetization detector as part of the power conversion system as shown in FIG. 4, certain components of a demagnetization detector as part of the power conversion system as shown in FIG. 6, and/or certain components of a demagnetization detector as part of the power conversion system as shown in FIG. 7 according to some embodiments of the present invention.

5. DETAILED DESCRIPTION OF THE INVENTION

Certain embodiments of the present invention are directed to integrated circuits. More particularly, some embodiments of the invention provide a system and method for output current regulation. Merely by way of example, some embodiments of the invention have been applied to power conversion systems. But it would be recognized that the invention has a much broader range of applicability.

FIG. 2 is a simplified diagram showing a power conversion system according to an embodiment of the present invention. This diagram is merely an example, which should not unduly limit the scope of the claims. One of ordinary skill in the art would recognize many variations, alternatives, and modifications.

The system 200 includes a system controller 202, resistors 208, 209, 218, 236 and 267, a full-wave rectifying bridge 213, capacitors 224, 234 and 242, a switch 230, an inductor 220, diodes 222 and 238, and LEDs 298. The system controller 202 includes a switch 232, a diode 250, a voltage clamper 252, a reference signal generator 258, an input-voltage detector 260, an enable controller 262, a demagnetization detector 264, a valley detector 266, a control logic component 268, a comparator 270, a driving component 272, a summation component 274, a high-low-input-line-voltage-compensation component 276, and a leading edge blanking (LEB) component 278. In addition, the system controller 202 includes terminals 231, 240, 246, 248 and 254. For example, the switch 230 includes a transistor (e.g., a field effect transistor, an insulated-gate bipolar transistor, or a bipolar junction transistor). In another example, the switch 232 includes a transistor (e.g., a field effect transistor, an insulated-gate bipolar transistor or a bipolar junction transistor). In another example, the terminal 248 (e.g., terminal GND) is biased at a ground voltage 204 (e.g., chip ground). In yet another example, the resistor 236 and the diode 238 are configured to adjust a turn-on/turn-off speed of the switch 230. As an example, a voltage associated with a gate terminal of the switch 230 is not constant during a transient period when the switch 230 is turned on or turned off. As another example, the voltage associated with the gate terminal of the switch 230 is constant during a time period long before or after the switch 230 is turned on or turned off.

According to one embodiment, an AC input 210 (e.g., VAC) is provided to input terminals 212 and 214, and the rectifying bridge 213 is configured, together with the capacitor 242, to provide a rectified input voltage 201 (e.g., $V_{bus}$). For example, the input voltage 201 (e.g., $V_{bus}$) is processed by a voltage divider including the resistors 208 and 209, and the system controller 202 receives an input signal 219 at the terminal 254 (e.g., terminal $V_{in}$). In another example, the input-voltage detector 260 receives the input signal 219 and outputs a signal 280 to the enable controller 262 that generates a signal 281 to the control logic component 268. In yet another example, the control logic component 268 outputs a modulation signal 282 to the driving component 272 that generates a drive signal 283 to affect (e.g., control) the switch 232.

According to another embodiment, the switch 232 and the switch 230 are connected in cascode. For example, the switch 232 is closed or opened for power switching. In another example, during an on-time period of a switching cycle associated with the drive signal 283, the switch 232 is closed (e.g., being turned on). In yet another example, a voltage signal 284 associated with a node (e.g., node SW) between the switches 230 and 232 decreases in magnitude, and in response the switch 230 is closed (e.g., being turned on). In yet another example, the inductor 220 is magnetized, and a current 290 flows through the switch 230 and is received by the system controller 202 at the terminal 231. In yet another example, a voltage 237 associated with a node between the switch 230 and the inductor 220 decreases in magnitude. In yet another example, a voltage signal 206 associated with the resistor 267 is detected by the system controller 202 at the terminal 246 (e.g., terminal CS), and the LEB component 278 receives the signal 206 and outputs a current sensing signal 277 to the comparator 270. In yet another example, during an off-time period of a switching cycle associated with the drive signal 283, the switch 232 is open (e.g., being turned off). In yet another example, the signal 284 increases in magnitude, and in response the switch 230 is opened (e.g., being turned off). In yet another example, the inductor 220 is demagnetized, and a current 292 flows through the diode 222, the capacitor 224, and the LEDs 298. In yet another example, the signal 237 increases in magnitude (e.g., to become close to the voltage 201). In yet another example, an output current 288 that flows through the LEDs 298 is associated with (e.g., equal to) an average current flowing through the inductor 220. In yet another example, if the average current flowing through the inductor 220 is regulated to a predetermined magnitude, the output current 288 that flows through the LEDs 298 is regulated to be approximately constant at a predetermined magnitude.

According to yet another embodiment, the signal 284 associated with the node SW between the switches 230 and 232 is received by the demagnetization detector 264 that is configured to determine a demagnetization period associated with the inductor 220. For example, the valley detector 266 receives a detection signal 285 from the demagnetization detector 264 and outputs a signal 286 to the control logic component 268. As an example, the valley detector 266 detects a first valley appearing in the signal 284 and changes the signal 286 so that a rising edge appears in the drive signal 283 and an on-time period of a switching cycle associated with the drive signal 283 begins. For example, the output current 288 is estimated based on at least information associated with the signal 206 and the demagnetization period associated with the inductor 220.

In one embodiment, during a start-up process of the system 200, the capacitor 234 is charged in response to the voltage signal 201 (e.g., through the resistor 218), and a voltage 235 increases in magnitude. For example, if the voltage signal 235 becomes larger than a start-up threshold voltage, the controller 202 begins to operate. As an example, the signal 219 related to (e.g., proportional to) the voltage signal 201 is sensed by the input-voltage detector 260. In another example, if the voltage signal 201 is smaller than a predetermined threshold, the input-voltage detector 260 outputs the signal 280 at a first logic level (e.g., 0), and if the voltage signal 201 is larger than the predetermined threshold, the input-voltage detector 260 outputs the signal 280 at a second logic level (e.g., 1). In yet another example, if the input-voltage detector 260 changes the signal 280 from the first logic level (e.g., 0) to the second logic level (e.g., 1), the enable controller 262 changes the signal 281 (e.g., to a logic high level). In yet another example, the control logic component 268 outputs the modulation signal 282 to turn on and off the switch 232 at a modulation frequency, so that the system 200 operates normally and the LEDs 298 are turned on. Thereafter, the enable controller 262 does not change the signal 281 in response to the signal 280. In some embodiments, the voltage signal 201 is always sensed by the input-voltage detector 260 during the operation of the system 200. In other embodiments, the voltage signal 201 is sensed by the input-voltage detector 260 during the start-up process and/or a short time period thereafter.

In another embodiment, when the switch 232 is opened (e.g., being turned off), the voltage 237 begins to increase in magnitude immediately after the switch 232 is opened. For example, the switch 230, the inductor 220 and the associated parasitic capacitances begin to oscillate. In another example, one or more spikes begin to appear in the signal 284 associated with the node (e.g., node SW) between the switch 230 and the switch 232. In yet another example, if the one or more spikes are larger than a clamping voltage associated with the voltage clamper 252 (e.g., a zener diode) plus a forward voltage associated with the diode 250, the spikes are absorbed by the capacitor 234 and the voltage clamper 252 through the diode 250. In yet another example, the one or more spikes provide supply charges or currents to the capacitor 234 to provide a supply voltage to the controller 202 through the terminal 240 (e.g., terminal VCC) for all internal circuits of the controller 202. In yet another example, the summation component 274 receives a compensation signal 271 from the high-low-input-line-voltage-compensation component 276 and a reference signal 273 and outputs a threshold signal 275 to the comparator 270 that outputs a comparison signal 299. In yet another example, if the comparison signal 299 changes from a first logic level (e.g., 1) to a second logic level (e.g., 0) which indicates that the current sensing signal 277 becomes larger than the threshold signal 275 in magnitude, a falling edge appears in the drive signal 283 and an on-time period of a switching cycle associated with the drive signal 283 ends. In yet another example, if the input line voltage (e.g., the signal 201) has a large magnitude, the signal 271 has a small magnitude (e.g., 0). In yet another example, if the input line voltage (e.g., the signal 201) has a small magnitude, the signal 271 has a large magnitude. As an example, the voltage signal 201 is inversely proportional to the signal 271 in magnitude.

Figure 3:
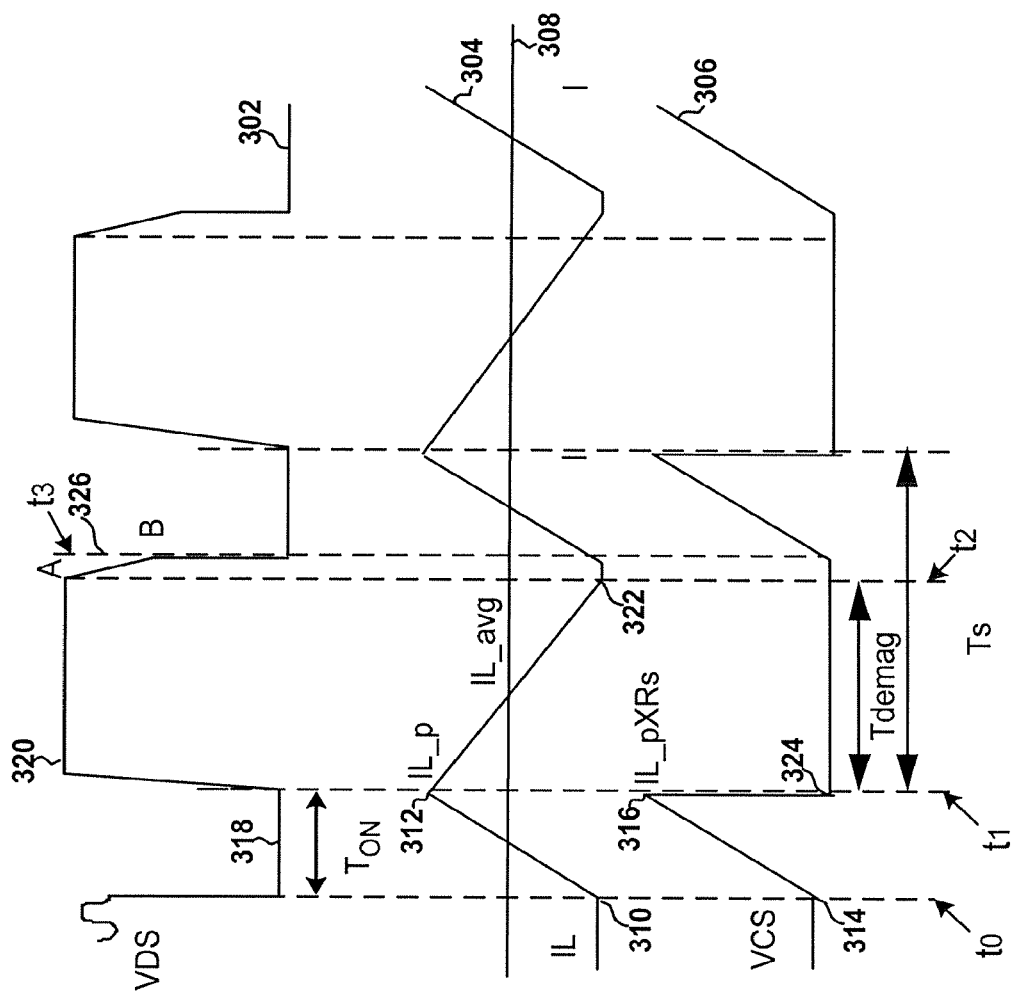
FIG. 3 is a simplified timing diagram for the power conversion system as shown in FIG. 2 according to an embodiment of the present invention.

FIG. 3 is a simplified timing diagram for the power conversion system 200 as shown in FIG. 2 according to an embodiment of the present invention. This diagram is merely an example, which should not unduly limit the scope of the claims. One of ordinary skill in the art would recognize many variations, alternatives, and modifications. For example, the waveforms 302, 304 and 306 describe certain operation of the power conversion system 200 that operates in a discontinuous conduction mode (DCM). The waveform 302 represents the signal 284 associated with the node SW as a function of time, the waveform 304 represents the current 292 flowing through the inductor 220 as a function of time, and the waveform 306 represents the current sensing signal 277 as a function of time. In some embodiments, the waveform 302 represents the voltage 237 associated with the node between the switch 230 and the inductor 220 as a function of time.

According to one embodiment, during an on-time period of the switch 232 (e.g., between $t_0$ and $t_1$), the signal 284 has a low magnitude 318 (e.g., zero), as shown by the waveform 302. For example, the current 292 increases from a magnitude 310 to a peak magnitude 312 (e.g., as shown by the waveform 304), and the current sensing signal 277 increases from a magnitude 314 to a magnitude 316 (e.g., as shown by the waveform 306). In another example, at $t_1$, the switch 232 is opened (e.g., being turned off), and the inductor 220 begins to demagnetize. In yet another example, the signal 284 increases from the magnitude 318 to a magnitude 320 and keeps at the magnitude 320 until the end of a demagnetization period of the inductor 220 (e.g., A at $t_2$), as shown by the waveform 302. In yet another example, during the demagnetization period, the current 292 decreases from the peak magnitude 312 (e.g., at $t_1$) to a magnitude 322 (e.g., at $t_2$ as shown by the waveform 304). In yet another example, at $t_1$, the current sensing signal 277 decreases from the magnitude 316 to a magnitude 324 and keeps at the magnitude 324 during the demagnetization period (e.g., as shown by the waveform 306). In yet another example, after the demagnetization period, the signal 284 decreases from the magnitude 320 (e.g., at $t_2$) to a magnitude 326 (e.g., B at $t_3$) which corresponds to a first valley appearing in the signal 284.

According to another embodiment, an average current 308 flowing through the inductor 220 is determined as follows:

$$IL\_avg \approx \frac{1}{2} \times IL\_P \tag{1}$$

where IL_avg represents the average current 308, and IL_P represents the peak magnitude 312 of the current 292. As an example, the peak magnitude 312 is determines as follows:

$$IL\_P = \frac{V\_th}{R_S} \tag{2}$$

where V_th represents the threshold signal 275, and $R_S$ represents the resistor 267. Combining Equation 1 and Equation 2, the average current 308 flowing through the inductor 220 is determined as follows:

$$IL\_avg \approx \frac{1}{2} \times \frac{V\_th}{R_S} \tag{3}$$

FIG. 4 is a simplified diagram showing a power conversion system according to another embodiment of the present invention. This diagram is merely an example, which should not unduly limit the scope of the claims. One of ordinary skill in the art would recognize many variations, alternatives, and modifications.

The system 400 includes a system controller 402, resistors 408, 409, 418 and 467, a full-wave rectifying bridge 413, capacitors 424, 434 and 442, an inductor 420, a diode 422, and LEDs 498. The system controller 402 includes switches 430 and 432, diodes 438 and 450, a resistor 436, a voltage clamper 452, a reference signal generator 458, an input-voltage detector 460, an enable controller 462, a demagnetization detector 464, a valley detector 466, a control logic component 468, a comparator 470, a driving component 472, a summation component 474, a high-low-input-line-voltage-compensation component 476, and a leading edge blanking (LEB) component 478. In addition, the system controller 202 includes terminals 431, 440, 446, 448 and 454. For example, the switch 430 includes a transistor (e.g., a field effect transistor, an insulated-gate bipolar transistor, or a bipolar junction transistor). In another example, the switch 432 includes a transistor (e.g., a field effect transistor, an insulated-gate bipolar transistor or a bipolar junction transistor).

In some embodiments, the resistors 408, 409, 418 and 467, the full-wave rectifying bridge 413, the capacitors 424, 434 and 442, the inductor 420, and the diode 422 are the same as the resistors 208, 209, 218 and 267, the full-wave rectifying bridge 213, the capacitors 224, 234 and 242, the inductor 220, and the diode 222, respectively. In certain embodiments, the switches 430 and 432, the diodes 438 and 450, the resistor 436, the voltage clamper 452, the reference signal generator 458, the input-voltage detector 460, the enable controller 462, the demagnetization detector 464, the valley detector 466, the control logic component 468, the comparator 470, the driving component 472, the summation component 474, the high-low-input-line-voltage-compensation component 476, and the LEB component 478 are the same as the switches 230 and 232, the diodes 238 and 250, the resistor 236, the voltage clamper 252, the reference signal generator 258, the input-voltage detector 260, the enable controller 262, the demagnetization detector 264, the valley detector 266, the control logic component 268, the comparator 270, the driving component 272, the summation component 274, the high-low-input-line-voltage-compensation component 276, and the LEB component 278, respectively. In some embodiments, the system 400 performs similar operations as the system 200.

Figure 5:
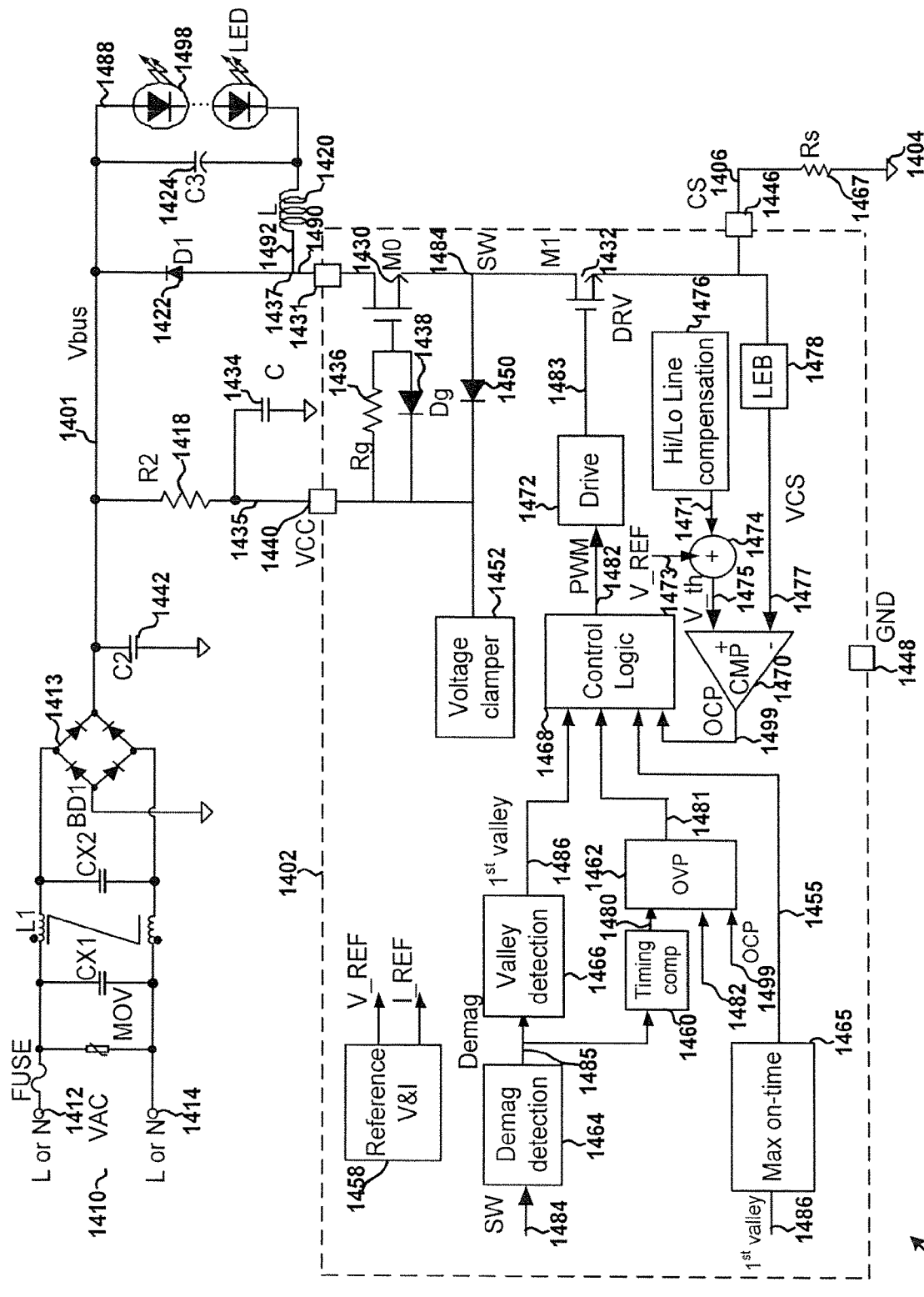
FIG. 5 is a simplified diagram showing a power conversion system according to yet another embodiment of the present invention.

FIG. 5 is a simplified diagram showing a power conversion system according to yet another embodiment of the present invention. This diagram is merely an example, which should not unduly limit the scope of the claims. One of ordinary skill in the art would recognize many variations, alternatives, and modifications.

The system 1400 includes a system controller 1402, resistors 1418 and 1467, a full-wave rectifying bridge 1413, capacitors 1424, 1434 and 1442, an inductor 1420, a diode 1422, and LEDs 1498. The system controller 1402 includes switches 1430 and 1432, diodes 1438 and 1450, a voltage clamper 1452, a reference signal generator 1458, a timing comparison component 1460, an over-voltage-protection (OVP) component 1462, a demagnetization detector 1464, a maximum-on-time component 1465, a valley detector 1466, a control logic component 1468, a comparator 1470, a driving component 1472, a summation component 1474, a high-low-input-line-voltage-compensation component 1476, and a LEB component 1478. In addition, the system controller 1402 includes terminals 1431, 1440, 1446 and 1448. For example, the switch 1430 includes a transistor (e.g., a field effect transistor, an insulated-gate bipolar transistor, or a bipolar junction transistor). In another example, the switch 1432 includes a transistor (e.g., a field effect transistor, an insulated-gate bipolar transistor or a bipolar junction transistor). In another example, the terminal 1448 (e.g., terminal GND) is biased at a ground voltage 1404 (e.g., chip ground). In yet another example, the resistor 1436 and the diode 1438 are configured to adjust a turn-on/turn-off speed of the switch 1430. As an example, a voltage associated with a gate terminal of the switch 1430 is not constant when the switch 1430 is turned on or turned off. As another example, the voltage associated with the gate terminal of the switch 1430 is approximately constant long before or after the switch 1430 is turned on or turned off.

According to one embodiment, an AC input 1410 (e.g., VAC) is provided to input terminals 1412 and 1414, and the rectifying bridge 1413 is configured, together with the capacitor 1442, to provide a voltage 1401 (e.g., $V_{bus}$). For example, the control logic component 1468 outputs a modulation signal 1482 (e.g., a pulse-width-modulation signal) to the driving component 1472 that generates a drive signal 1483 to affect the switch 1432. In another example, the switch 1432 and the switch 1430 are connected in cascode. In yet another example, the switch 1432 is closed or opened for power switching. In yet another example, during an on-time period of the switch 1432, the switch 1432 is closed (e.g., being turned on). In yet another example, a signal 1484 associated with a node (e.g., node SW) between the switches 1430 and 1432 decreases in magnitude, and in response the switch 1430 is closed (e.g., being turned on). In yet another example, the inductor 1420 is magnetized, and a current 1490 flows through the switch 1430 and is received by the system controller 1402 at the terminal 1431. In yet another example, a voltage 1437 associated with a node between the switch 1430 and the inductor 1420 decreases in magnitude. In yet another example, a voltage signal 1406 associated with the resistor 1467 is detected by the system controller 1402 at the terminal 1446 (e.g., terminal CS), and the LEB component 1478 receives the signal 1406 and outputs a current sensing signal 1477 to the comparator 1470. In yet another example, during an off-time period of a switching cycle associated with the drive signal 1483, the switch 1432 is open (e.g., being turned off). In yet another example, the signal 1484 increases in magnitude, and in response the switch 1430 is opened (e.g., being turned off). In yet another example, the inductor 1420 is demagnetized, and a current 1492 flows through the inductor 1420. As an example, the current 1492 flows through the diode 1422 and is provided to the capacitor 1424 and the LEDs 1498. In yet another example, the signal 1437 increases in magnitude (e.g., to become close to the voltage 1401). In yet another example, an output current 1488 that flows through the LEDs 1498 is associated with (e.g., equal to) an average current flowing through the inductor 1420. In yet another example, if the average current flowing through the inductor 1420 is regulated to a predetermined magnitude, the output current 1488 that flows through the LEDs 1498 is regulated to be approximately constant at a predetermined magnitude.

According to another embodiment, the signal 1484 associated with the node SW between the switches 1430 and 1432 is received by the demagnetization detector 1464 that is configured to determine a demagnetization period associated with the inductor 1420. For example, the valley detector 1466 receives a detection signal 1485 from the demagnetization detector 1464 and outputs a signal 1486 to the control logic component 1468. As an example, the valley detector 1466 detects a first valley appearing in the signal 1484 and changes the signal 1486 so that a rising edge appears in the drive signal 1483 and an on-time period of a switching cycle associated with the drive signal 1483 begins. For example, the output current 1488 is estimated based on at least information associated with the signal 1406 and the demagnetization period associated with the inductor 1420.

According to yet another embodiment, during a start-up process of the system 1400, the capacitor 1434 is charged in response to the voltage signal 1401 (e.g., through the resistor 1418), and a voltage 1435 increases in magnitude. For example, if the voltage 1435 becomes larger than a start-up threshold voltage, the controller 1402 begins to operate. In another example, when the switch 1432 is opened (e.g., being turned off), the voltage signal 1437 begins to increase in magnitude immediately after the switch 1432 is opened. As an example, the switch 1430, the inductor 1420 and the associated parasitic capacitances begin to oscillate. In another example, one or more spikes begin to appear in the signal 1484 associated with the node (e.g., node SW) between the switch 1430 and the switch 1432. In yet another example, if the one or more spikes are larger than a clamping voltage associated with the voltage clamper 1452 (e.g., a zener diode) plus a forward voltage associated with the diode 1450, the spikes are absorbed by the capacitor 1434 and the voltage clamper 1452 through the diode 1450. In yet another example, the one or more spikes provide supply charges or currents to the capacitor 1434 to provide a supply voltage to the controller 1402 through the terminal 1440 (e.g., terminal VCC). In yet another example, all internal circuits of the controller 1402 obtain power through the terminal 1440 (e.g., terminal VCC). In yet another example, the summation component 1474 receives a compensation signal 1471 from the high-low-input-line-voltage-compensation component 1476 and a reference signal 1473 and outputs a threshold signal 1475 to the comparator 1470 that outputs a comparison signal 1499. In yet another example, if the input line voltage (e.g., the signal 1401) has a large magnitude, the signal 1471 has a small magnitude (e.g., 0). In yet another example, if the input line voltage (e.g., the signal 1401) has a small magnitude, the signal 1471 has a large magnitude. In yet another example, if the comparison signal 1499 changes from a first logic level (e.g., 1) to a second logic level (e.g., 0) which indicates that the current sensing signal 1477 becomes larger than the threshold signal 1475 in magnitude, the drive signal 1483 decreases in magnitude (e.g., from a logic high to a logic low) and an on-time period of a switching cycle associated with the drive signal 1483 ends.

According to yet another embodiment, the timing comparison component 1460 receives the detection signal 1485 and outputs a signal 1480 to the OVP component 1462. For example, the OVP component 1462 also receives the comparison signal 1499 and the modulation signal 1482 and generates a signal 1481 to the control logic component 1468. In another example, the demagnetization period is inversely proportional to an output voltage associated with the LEDs 1498, as follows:

$$V_{out} = \frac{IL\_P \times L}{T_{demag}} \quad (4)$$

where $V_{out}$ represents the output voltage associated with the LEDs 1498, IL_P represents a peak magnitude of the current 1492, L represents an inductance of the inductor 1420 and $T_{demag}$ represents a duration of the demagnetization period. According to Equation 4, if the peak magnitude of the current 1492 keeps approximately constant, the higher the output voltage (e.g., increasing in magnitude), the shorter the demagnetization periods (e.g., decreasing in magnitude), in some embodiments.

In one embodiment, the timing comparison component 1460 compares the demagnetization period with a predetermined time period which starts from a beginning of the demagnetization process associated with the inductor 1420. For example, if, during a switch cycle, the comparison signal 1499 indicates that the current sensing signal 1477 is larger than or equal to the threshold signal 1475 in magnitude, and if, during an off-time period of the switch cycle, the demagnetization period is smaller than the predetermined time period, the over-voltage protection is triggered. As an example, the signal 1480 changes to indicate that the demagnetization period is smaller than the predetermined time period, and in response the OVP component 1482 changes the signal 1481 to shut down the system 1400. As another example, the OVP component 1482 changes the signal 1481 from a first signal state (e.g., corresponding to a first logic level) to a second signal state (e.g., corresponding to a second logic level) to shut down the system 1400. In another example, during and after the shut-down process, the signal 1483 is equal to a ground voltage in magnitude, so that the switch 1432 (e.g., M1) is open (e.g., being turned off) for a long period of time.

In another embodiment, the AC input 1410 is not applied (e.g., being turned off). For example, the supply voltage provided through the terminal 1440 (e.g., terminal VCC) decreases in magnitude to become smaller than a first predetermined threshold (e.g., an under-voltage lock-up threshold), and in response, the internal circuits of the controller 1402 are reset to certain initial conditions. In yet another embodiment, after the internal circuits of the controller 1402 have been reset to the certain initial conditions, the AC input 1410 is applied (e.g., being turned on) again. For example, the supply voltage provided through the terminal 1440 (e.g., terminal VCC) increases in magnitude to become larger than a second predetermined threshold (e.g., a power-on-reset threshold), and in response the controller 1402 begins normal operations again.

In yet another embodiment, if, during an on-time period of a switch cycle related to the switch 1432, the comparison signal 1499 indicates that the current sensing signal 1477 keeps being smaller than the threshold signal 1475 in magnitude, the OVP component 1462 does not change the signal 1481 and the signal 1481 would not cause the system 1400 to stop outputting signals (e.g., the over-voltage protection not being triggered) so that the switch 1432 is kept open (e.g., being turned off) for a long time period, regardless of whether the signal 1480 indicates that the demagnetization period is smaller than the predetermined time period. For example, if the current sensing signal 1477 is larger than the threshold signal 1475 in magnitude, the comparison signal 1499 is at a logic low level. In another example, once the OVP component 1482 changes the signal 1481 to shut down the system 1400, the OVP component 1482 no longer changes the signal 1481 in response to the signal 1480, the signal 1499 and/or the signal 1482. In yet another example, the maximum-on-time component 1465 detects a beginning of an on-time period of a switching cycle associated with the drive signal 1483 based on at least information associated with the signal 1486 and determines whether the on-time period exceeds a maximum on-time period. If the on-time period exceeds the maximum on-time period, the maximum-on-time component 1465 outputs a signal 1455 to the control logic component 1468 to change the drive signal 1483 to open (e.g., turn off) the switch 1432.

In yet another embodiment, during an on-time period of each switch cycle associated with the switch 1432, if the signal 1499 does not indicate that the current sensing signal 1477 is larger than or equal to the threshold signal 1475 in magnitude, the OVP component 1462 is in an abnormal operation mode. For example, the OVP component 1462 does not respond to the output of the timing comparison component 1460 (e.g., associated with the comparison result of the demagnetization period and the predetermined time period). As an example, the OVP operations are prohibited and the on-time period of the switch 1432 corresponds to a maximum on-time period. But if the signal 1499 indicates that the current sensing signal 1477 is larger than or equal to the threshold signal 1475 in magnitude, the OVP component 1462 responds to the output of the timing comparison component 1460, and the OVP operations are enabled, according to certain embodiments. For example, the OVP component 1462 enters the normal operation mode and remains in the normal operation mode. In another example, if the current sensing signal 1477 is larger than or equal to the threshold signal 1475 in magnitude, the modulation signal 1482 is changed to indicate that the on-time period of the switch cycle has ended and an off-time period begins. In yet another example, during the off-time period of the switch cycle, the switch 1432 is open (e.g., being turned off).

In yet another embodiment, when the demagnetization process ends, the valley detector 1466 outputs the signal 1486 to change the modulation signal 1482 to indicate that an off-time period of the switch cycle has ended, the next switch cycle starts. For example, during an on-time period of the next switch cycle, if the signal 1499 does not indicate that the current sensing signal 1477 is larger than or equal to the threshold signal 1475 in magnitude, the OVP component 1462 is in the abnormal operation mode. As an example, the OVP component 1462 does not respond to the output of the timing comparison component 1460 (e.g., associated with the comparison result of the demagnetization period and the predetermined time period). As an example, the OVP operations are prohibited and the on-time period of the switch 1432 corresponds to a maximum on-time period. But if the signal 1499 indicates that the current sensing signal 1477 is larger than or equal to the threshold signal 1475 in magnitude, the OVP component 1462 responds to the output of the timing comparison component 1460, and the OVP operations are enabled, according to certain embodiments. For example, the OVP component 1462 enters the normal operation mode and remains in the normal operation mode. In another example, if the current sensing signal 1477 is larger than or equal to the threshold signal 1475 in magnitude, the modulation signal 1482 is changed to indicate that the on-time period of the switch cycle has ended and an off-time period begins.

According to one embodiment, if the OVP component 1462 is in the abnormal operation mode, the OVP component 1462 keeps the signal 1481 at a particular logic level (e.g., a logic low, 0) regardless of the signals 1480 so that the signal 1481 would not cause the system 1400 to be shut down due to mistakenly triggered over-voltage protection. For example, if the OVP component 1462 is in the normal operation mode and the demagnetization period is no smaller than the predetermined time period, in response to the signal 1480 indicating that the demagnetization period is no smaller than the predetermined time period, the signal 1481 remains unchanged and does not cause the system 1400 to be shut down.

According to another embodiment, if the OVP component 1462 is in the normal operation mode and the demagnetization period is smaller than the predetermined time period, in response to the signal 1480 indicates that the demagnetization period is smaller than the predetermined time period, the OVP component 1482 changes the signal 1481 in order to shut down the system 1400. For example, after the OVP component 1482 changes the signal 1481 to shut down the system 1400, the signal 1481 will remain the same regardless of the signal 1480, the signal 1499, and/or 1482.

FIG. 6 is a simplified diagram showing a power conversion system according to yet another embodiment of the present invention. This diagram is merely an example, which should not unduly limit the scope of the claims. One of ordinary skill in the art would recognize many variations, alternatives, and modifications.

The system 500 includes a system controller 502, resistors 508, 509, 518, 536 and 567, a full-wave rectifying bridge 513, capacitors 524, 534 and 542, a switch 530, an inductor 520, diodes 522 and 538, and LEDs 598. The system controller 502 includes a switch 532, a diode 550, a voltage clamper 552, a reference signal generator 558, an input-voltage detector 560, an enable controller 562, a demagnetization detector 564, a valley detector 566, a control logic component 568, a comparator 570, a driving component 572, an error amplifier 574, a compensation-network component 576, a sampling component 561 and a LEB component 578. In addition, the system controller 502 includes terminals 531, 540, 546, 548 and 554. For example, the switch 530 includes a transistor (e.g., a field effect transistor, an insulated-gate bipolar transistor, or a bipolar junction transistor). In another example, the switch 532 includes a transistor (e.g., a field effect transistor, an insulated-gate bipolar transistor or a bipolar junction transistor).

According to one embodiment, the resistors 508, 509, 518, 536 and 567, the full-wave rectifying bridge 513, the capacitors 524, 534 and 542, the switch 530, the inductor 520, and the diodes 522 and 538 are the same as the resistors 208, 209, 218, 236 and 267, the full-wave rectifying bridge 213, the capacitors 224, 234 and 242, the switch 230, the inductor 220, and the diodes 222 and 238, respectively. For example, the switch 532, the diode 550, the voltage clamper 552, the reference signal generator 558, the input-voltage detector 560, the enable controller 562, the demagnetization detector 564, the valley detector 566, the control logic component 568, the driving component 572, and the LEB component 578 are the same as the switch 232, the diode 250, the voltage clamper 252, the reference signal generator 258, the input-voltage detector 260, the enable controller 262, the demagnetization detector 264, the valley detector 266, the control logic component 268, the driving component 272, and the LEB component 278, respectively.

According to one embodiment, an AC input 510 (e.g., VAC) is provided to input terminals 512 and 514, and the rectifying bridge 513 is configured, together with the capacitor 542, to provide a voltage 501 (e.g., $V_{bus}$). For example, the voltage 501 (e.g., $V_{bus}$) is processed by a voltage divider including the resistors 508 and 509, and the system controller 502 receives an input signal 519 at the terminal 554 (e.g., terminal $V_{in}$). In another example, the input-voltage detector 560 receives the input signal 519 and outputs a signal 580 to the enable controller 562 that generates a signal 581 to the control logic component 568. In yet another example, the control logic component 568 outputs a modulation signal 582 to the driving component 572 that generates a drive signal 583 to affect the switch 532.

According to another embodiment, the switch 532 and the switch 530 are connected in cascode. For example, the switch 532 is closed or opened for power switching. In another example, during an on-time period of the switch 532, the switch 532 is closed (e.g., being turned on). In yet another example, a signal 584 associated with a node (e.g., node SW) between the switches 530 and 532 decreases in magnitude, and in response the switch 530 is closed (e.g., being turned on). In yet another example, the inductor 520 is magnetized, and a current 590 flows through the switch 530 and is received by the system controller 502 at the terminal 531. In yet another example, a voltage 537 associated with a node between the switch 530 and the inductor 520 decreases in magnitude. In yet another example, a voltage signal 506 associated with the resistor 567 is detected by the system controller 502 at the terminal 546 (e.g., terminal CS), and the LEB component 578 receives the signal 506 and outputs a current sensing signal 577 to the comparator 570. In yet another example, during an off-time period of a switching cycle associated with the drive signal 583, the switch 532 is open (e.g., being turned off). In yet another example, the signal 584 increases in magnitude, and in response the switch 530 is opened (e.g., being turned off). In yet another example, the inductor 520 is demagnetized, and a current 592 flows through the diode 522, the capacitor 524, and the LEDs 598. In yet another example, the signal 537 increases in magnitude (e.g., to become close to the voltage 501). In yet another example, the error amplifier 574 includes a transconductance amplifier. In yet another example, the error amplifier 574 is implemented as part of an integrator.

According to yet another embodiment, an output current 588 that flows through the LEDs 598 is associated with (e.g., equal to) an average current flowing through the inductor 520. For example, if the system 500 operates in a quasi-resonant (QR) mode, the average current flowing through the inductor 520 is approximately equal to half of a peak magnitude of the current 590. In another example, one or more peak magnitudes of the current sensing signal 577 during one or more previous switching periods associated the switch 532 are detected (e.g., sampled) by the sampling component 561 that outputs a signal 551. In yet another example, the error amplifier 574 receives the signal 551 and a reference signal 553 and amplifies a difference between the signal 551 and the reference signal 553. In yet another example, the error amplifier 574 outputs a signal 555 (e.g., a current signal) to the compensation-network component 576 that outputs a signal 557 to the comparator 570. In yet another example, the comparator 570 compares the signal 557 and the current sensing signal 577 and outputs a comparison signal 559 to the control logic component 568 so as to affect one or more peak magnitudes of the current 590 during one or more next switching periods associated with the switch 532 so that the average current flowing through the inductor 520 is regulated. In yet another example, if the comparison signal 559 changes from a first logic level (e.g., 1) to a second logic level (e.g., 0) which indicates that the current sensing signal 577 becomes larger than the signal 557 in magnitude, the drive signal 583 changes from the first logic level (e.g., 1) to the second logic level (e.g., 0) and an on-time period of a switching cycle associated with the drive signal 583 ends. In yet another example, the first logic level corresponds to 5 volts, and the second logic level corresponds to 0 volt.

According to yet another embodiment, the signal 584 associated with the node SW between the switches 530 and 532 is received by the demagnetization detector 564 that is configured to determine a demagnetization period associated with the inductor 520. For example, the valley detector 566 receives a detection signal 585 from the demagnetization detector 564 and outputs a signal 586 to the control logic component 568. As an example, the valley detector 566 detects a first valley appearing in the signal 584, and changes the signal 586 so that the drive signal 583 changes from the second logic level (e.g., 0) to the first logic level (e.g., 1) and an on-time period of a switching cycle associated with the drive signal 583 begins. For example, the magnitude of the output current 588 can be estimated based on at least information associated with the signal 506 and the demagnetization period associated with the inductor 520.

In one embodiment, during a start-up process of the system 500, the capacitor 534 is charged in response to the voltage signal 501 (e.g., through the resistor 518), and a voltage 535 increases in magnitude. For example, if the voltage 535 becomes larger than a start-up threshold voltage, the controller 502 begins to operate. As an example, the signal 519 related to (e.g., proportional to) the voltage signal 501 is sensed by the input-voltage detector 560. As another example, if the voltage signal 501 is larger than a predetermined threshold, the enable controller 562 outputs the signal 581 (e.g., at a logic high level). As yet another example, the control logic component 568 outputs the modulation signal 582 to turn on and off the switch 532 at a modulation frequency so that the system 200 operates normally and the LEDs 298 are turned on. As yet another example, if the voltage signal 501 is smaller than the predetermined threshold, the controller 502 is in an off mode, and the enable controller 562 outputs the signal 581 (e.g., at a logic low level) so that the control logic component 568 does not output the modulation signal 582 to turn on and off the switch 532 at the modulation frequency. As yet another example, the switch 532 keeps being open (e.g., being turned off), so that there is little current flowing through the LEDs 598 which is not turned on. In some embodiments, the voltage signal 501 is always sensed by the input-voltage detector 560 during the operation of the system 500. In other embodiments, the voltage signal 501 is sensed by the input-voltage detector 560 during the start-up process and/or a short time period thereafter. In some embodiments, during the start-up process, once the voltage signal 501 becomes larger than the predetermined threshold, the enable controller 562 outputs the signal 581 so that the system 500 starts operation. For example, once the system 500 starts operation, even if the signal 501 becomes smaller than the predetermined threshold, the enable controller 562 does not change the signal 581 and the signal 581 remains at a same logic level (e.g., the logic low level), so that the system 500 continues normal operations.

In another embodiment, when the switch 532 is opened (e.g., being turned off), the voltage 537 begins to increase in magnitude immediately after the switch 532 is opened. For example, the switch 530, the inductor 520 and the associated parasitic capacitances begin to oscillate. In another example, one or more spikes begin to appear in the signal 584 associated with the node (e.g., node SW) between the switch 530 and the switch 532. In yet another example, if the one or more spikes are larger than a clamping voltage associated with the voltage clamper 552 (e.g., a zener diode) plus a forward voltage associated with the diode 550, the spikes are absorbed by the capacitor 534 and the voltage clamper 552 through the diode 550. In yet another example, the one or more spikes provide supply charges or currents to the capacitor 534 to provide a supply voltage to the controller 502 through the terminal 540 (e.g., terminal VCC). In yet another example, all internal circuits of the controller 502 obtain power through the terminal 540 (e.g., terminal VCC).

FIG. 7 is a simplified diagram showing a power conversion system according to yet another embodiment of the present invention. This diagram is merely an example, which should not unduly limit the scope of the claims. One of ordinary skill in the art would recognize many variations, alternatives, and modifications.

The system 600 includes a system controller 602, resistors 608, 609, 618, and 667, a full-wave rectifying bridge 613, capacitors 624, 634 and 642, an inductor 620, a diode 622, and LEDs 698. The system controller 602 includes a switch 632, diodes 638 and 650, a resistor 636, a voltage clamper 652, a reference signal generator 658, an input-voltage detector 660, an enable controller 662, a demagnetization detector 664, a valley detector 666, a control logic component 668, a comparator 670, a driving component 672, an error amplifier 674, a compensation-network component 676, a sampling component 661 and a LEB component 678. In addition, the system controller 602 includes terminals 631, 640, 646, 648 and 654. For example, the switch 630 includes a transistor (e.g., a field effect transistor, an insulated-gate bipolar transistor, or a bipolar junction transistor). In another example, the switch 632 includes a transistor (e.g., a field effect transistor, an insulated-gate bipolar transistor or a bipolar junction transistor).

According to one embodiment, the resistors 608, 609, 618, 636 and 667, the full-wave rectifying bridge 613, the capacitors 624, 634 and 642, the switch 630, the inductor 620, and the diodes 622 and 638 are the same as the resistors 508, 509, 518, 536 and 567, the full-wave rectifying bridge 513, the capacitors 524, 534 and 542, the switch 530, the inductor 520, and the diodes 522 and 538, respectively. For example, the switch 632, the diode 650, the voltage clamper 652, the reference signal generator 658, the input-voltage detector 660, the enable controller 662, the demagnetization detector 664, the valley detector 666, the control logic component 668, the driving component 672, the comparator 670, the error amplifier 674, the compensation-network component 676, the sampling component 661, and the LEB component 678 are the same as the switch 532, the diode 550, the voltage clamper 552, the reference signal generator 558, the input-voltage detector 560, the enable controller 562, the demagnetization detector 564, the valley detector 566, the control logic component 568, the driving component 572, the comparator 570, the error amplifier 574, the compensation-network component 576, the sampling component 561, and the LEB component 578, respectively. In some embodiments, the system 600 performs similar operations as the system 500.

Figure 8:
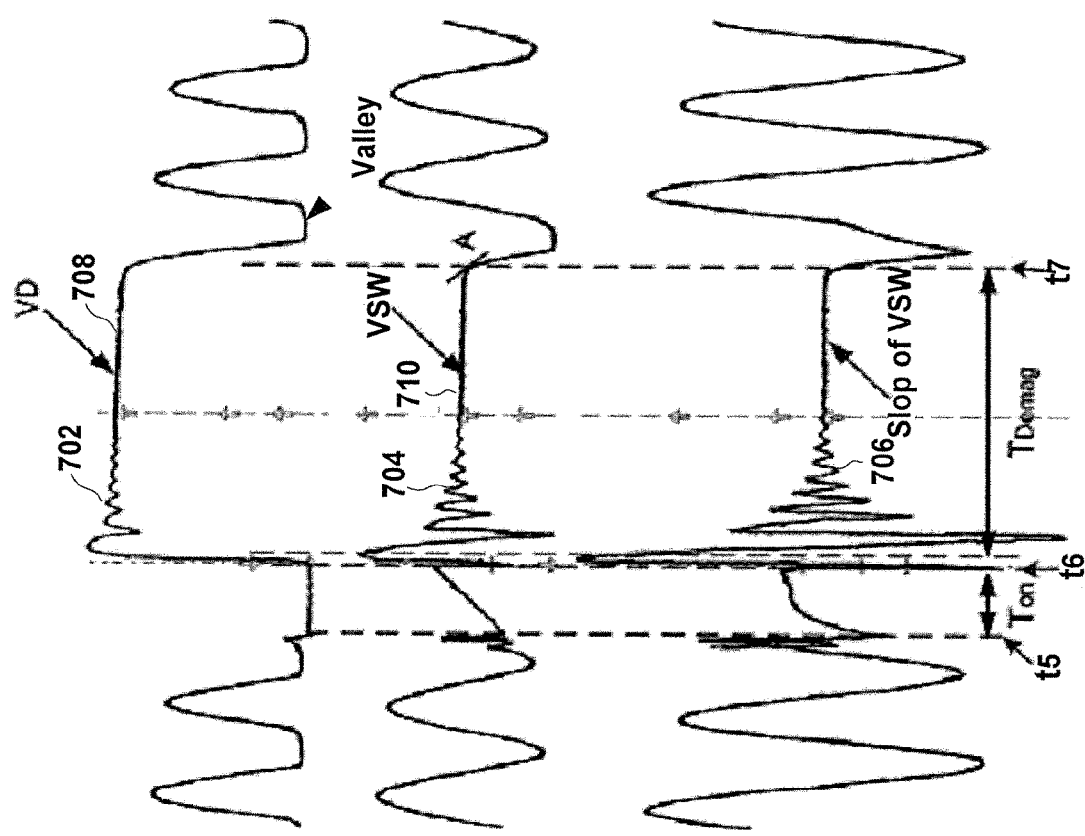
FIG. 8 is a simplified timing diagram for demagnetization detection of the power conversion system as shown in FIG. 2, the power conversion system as shown in FIG. 4, the power conversion system as shown in FIG. 6 and/or the power conversion system as shown in FIG. 7 according to some embodiments of the present invention.

FIG. 8 is a simplified timing diagram for demagnetization detection of the power conversion system 200 as shown in FIG. 2, the power conversion system 400 as shown in FIG. 4, the power conversion system 500 as shown in FIG. 6 and/or the power conversion system 600 as shown in FIG. 7 according to some embodiments of the present invention. This diagram is merely an example, which should not unduly limit the scope of the claims. One of ordinary skill in the art would recognize many variations, alternatives, and modifications.

For example, the waveforms 702, 704 and 706 describe certain operations of the power conversion system 200 that operates in a discontinuous conduction mode (DCM), certain operations of the power conversion system 400 that operates in a discontinuous conduction mode (DCM), certain operations of the power conversion system 500 that operates in a discontinuous conduction mode (DCM), and/or certain operations of the power conversion system 600 that operates in a discontinuous conduction mode (DCM). In another example, the waveform 702 represents the signal 237 as a function of time, the waveform 704 represents the signal 284 as a function of time, and the waveform 706 represents a slope of the signal 284 as a function of time. In yet another example, an on-time period, $T_{on}$, starts at time $t_5$ and ends at time $t_6$, and a demagnetization period, $T_{demag}$, starts at the time $t_6$ and ends at time $t_7$. In yet another example, $t_5 \leq t_6 \leq t_7$.

According to one embodiment, during the on-time period (e.g., $T_{on}$), both the switch 230 and the switch 232 are closed (e.g., being turned on). For example, the current 290 that flows through the switch 230 increases in magnitude. In another example, the signal 237 (e.g., $V_D$) and the signal 284 (e.g., $V_{SW}$) have low magnitudes (e.g., as shown by the waveform 702 and the waveform 704 respectively). In yet another example, if both the switch 230 and the switch 232 are open (e.g., being turned off), the current 290 reduces to a low magnitude (e.g., zero), and the demagnetization process starts. For example, during the demagnetization period $T_{demag}$, the signal 237 (e.g., $V_D$) is approximately at a magnitude 708 (e.g., as shown by the waveform 702), and the signal 284 (e.g., $V_{SW}$) is approximately at a magnitude 710 (e.g., as shown by the waveform 704). In yet another example, the demagnetization process ends at the time $t_7$. For example, the signal 284 (e.g., $V_{SW}$) decreases rapidly in magnitude (e.g., as shown by the waveform 704). In another example, the demagnetization can be detected based on information associated with the signal 284 (e.g., $V_{SW}$).

As discussed above and further emphasized here, FIG. 8 is merely examples, which should not unduly limit the scope of the claims. One of ordinary skill in the art would recognize many variations, alternatives, and modifications. For example, though the above discussion of FIG. 8 is based on the timing diagram of the power conversion system 200 operating in the DCM mode, the scheme for demagnetization detection applies to the power conversion system 200 operating in the continuous conduction mode or in the quasi-resonant mode according to certain embodiments. As an example, the waveform 702 represents a signal 437 associated with a node between the switch 430 and the inductor 420 as a function of time, the waveform 704 represents a signal 484 associated with a node between the switch 430 and the switch 432 as a function of time, and the waveform 706 represents a slope of the signal 484 as a function of time. In another example, the waveform 702 represents the signal 537 as a function of time, the waveform 704 represents the signal 584 as a function of time, and the waveform 706 represents a slope of the signal 584 as a function of time. As another example, the waveform 702 represents a signal 637 associated with a node between the switch 630 and the inductor 620 as a function of time, the waveform 704 represents a signal 684 associated with a node between the switch 630 and the switch 632 as a function of time, and the waveform 706 represents a slope of the signal 684 as a function of time.

FIG. 9 is a simplified diagram showing certain components of the demagnetization detector 264 as part of the power conversion system 200 as shown in FIG. 2, certain components of the demagnetization detector 464 as part of the power conversion system 400 as shown in FIG. 4, certain components of the demagnetization detector 564 as part of the power conversion system 500 as shown in FIG. 6, and/or certain components of the demagnetization detector 664 as part of the power conversion system 600 as shown in FIG. 7 according to some embodiments of the present invention. This diagram is merely an example, which should not unduly limit the scope of the claims. One of ordinary skill in the art would recognize many variations, alternatives, and modifications. For example, the demagnetization detector 264 includes a capacitor 802, two resistors 804 and 806, a comparator 808, a blanking component 810, a timing control component 812, two flip-flop components 814 and 819, a NOT gate 816, and an AND gate 818.

According to one embodiment, the signal 284 (e.g., $V_{SW}$) is received at the capacitor 802. For example, the slope of the signal 284 is detected using a differentiator including the capacitor 802 and the resistors 804 and 806. In another example, a differentiated signal 820 is generated, and is equal to the slope of the signal 284 plus a direct-current (DC) offset $V_m$. In yet another example, the DC offset $V_m$ is determined based on the following equation.

$$V_m = V_{ref1} \times \frac{R_4}{R_3 + R_4} \qquad (5)$$

where $V_m$ represents the DC offset, $V_{ref1}$ represents a reference voltage 824, $R_3$ represents the resistance of the resistor 804, and $R_4$ represents the resistance of the resistor 806.

According to another embodiment, the comparator 808 receives the differentiated signal 820 and a threshold signal 822 and outputs a comparison signal 826 to the blanking component 810 to affect the flip-flop components 814 and 816. For example, the drive signal 283 is received by the blanking component 810 and the timing control component 812 to affect the flip-flop components 814 and 816. In another example, for each switching cycle, a demagnetization process starts when the switch 232 is open (e.g., off) in response to the drive signal 283. In yet another example, during the demagnetization process, the differentiated signal 820 is no less than the threshold signal 822 in magnitude. In yet another example, if the differentiated signal 820 becomes smaller than the threshold signal 822 in magnitude, then the end of the demagnetization process is detected. In yet another example, the comparator 808 changes the comparison signal 826 in order to change the detection signal 285.

As discussed above and further emphasized here, FIG. 9 is merely examples, which should not unduly limit the scope of the claims. One of ordinary skill in the art would recognize many variations, alternatives, and modifications.

For example, though the above discussion of FIG. 9 is based on the diagram of the demagnetization detector 264 as part of the power conversion system 200, the scheme for demagnetization detection applies to the demagnetization detector 464 as part of the power conversion system 400, the demagnetization detector 564 as part of the power conversion system 500, and/or the demagnetization detector 664 as part of the power conversion system 600.

According to one embodiment, a system controller for regulating a power conversion system includes: a detection component configured to receive an input voltage related to a diode connected to an inductor and output a first signal at a first logic level in response to the input voltage being larger than a predetermined threshold; a control logic component configured to receive the first signal, process information associated with the first signal, and output a modulation signal related to a modulation frequency in response to the first signal being at the first logic level; and a driving component configured to receive the modulation signal and output a drive signal to open and close a first switch at the modulation frequency, so that in response to the first switch being closed, the inductor is configured to output a first current through the switch and in response to the first switch being open, the inductor is configured to output a second current through the diode. For example, the system controller is implemented according to at least FIG. 2, FIG. 4, FIG. 5, FIG. 6, and/or FIG. 7.

According to another embodiment, a system controller for regulating a power conversion system includes: a first transistor including a first transistor terminal, a second transistor terminal, and a third transistor terminal, the first transistor terminal being coupled to a fourth transistor terminal of a second transistor, the second transistor further including a fifth transistor terminal and a sixth transistor terminal. The fifth transistor terminal is coupled to a first resistor terminal of a first resistor, the first resistor further including a second resistor terminal. The fifth transistor terminal is coupled to a first diode terminal of a first diode, the first diode further including a second diode terminal. The second diode terminal is coupled to the second resistor terminal. The system controller is configured to change a first voltage of the fourth transistor terminal to turn on and off the second transistor and to affect a current flowing through an inductor. For example, the system controller is implemented according to at least FIG. 2, FIG. 4, FIG. 5, FIG. 6, and/or FIG. 7.

According to yet another embodiment, a system controller for regulating a power conversion system includes: a sampling component configured to detect one or more peak magnitudes of a current sensing signal associated with a first current from an inductor flowing through a switch and generate an output signal based on at least information associated with the detected one or more peak magnitudes of the current sensing signal; an error amplifier configured to receive the output signal and a reference signal and generate an amplified signal based on at least information associated with the output signal and the reference signal; a comparator configured to receive the current sensing signal and a first signal associated with the amplified signal and output a comparison signal based on at least information associated with the first signal and the current sensing signal; and a control-and-drive component configured to receive the comparison signal and output a drive signal based on at least information associated with the comparison signal to close or open the switch to affect the first current. For example, the system controller is implemented according to at least FIG. 2, FIG. 4, FIG. 5, FIG. 6, and/or FIG. 7.

According to yet another embodiment, a system controller for regulating a power conversion system includes: a protection component configured to receive a first signal and a second signal and generate a third signal based on at least information associated with the first signal and the second signal, the first signal being associated with a demagnetization period related to an inductor, the second signal being associated with a first current flowing through the inductor; and a control-and-drive component configured to receive the third signal and output a drive signal to the switch to affect the first current. The protection component is further configured to, in response to, the second signal indicating, during a first switching cycle associated with the drive signal, that the first current is equal to or larger than a current threshold, and the first signal indicating, during an off-time period of the first switching cycle, that the demagnetization period is smaller than a predetermined time period, change the third signal from a first signal state to a second signal state to cause the power conversion system to be shut down. For example, the system controller is implemented according to at least FIG. 5.

In one embodiment, a method for regulating a power conversion system includes: receiving an input voltage related to a diode connected to an inductor; processing information associated with the input signal; outputting a first signal at a first logic level in response to the input voltage being larger than a predetermined threshold; receiving the first signal; and processing information associated with the first signal. The method further includes: outputting a modulation signal related to a modulation frequency in response to the first signal being at the first logic level; receiving the modulation signal; and processing information associated with the modulation signal. In addition, the method includes: outputting a drive signal to open and close a first switch at the modulation frequency; in response to the first switch being closed, outputting a first current through the switch; and in response to the first switch being open, outputting a second current through the diode. For example, the method is implemented according to at least FIG. 2, FIG. 4, FIG. 5, FIG. 6, and/or FIG. 7.

In another embodiment, a method for regulating a power conversion system includes: sampling one or more peak magnitudes of a current sensing signal associated with a first current from an inductor flowing through a switch; generating an output signal based on at least information associated with the detected one or more peak magnitudes of the current sensing signal; receiving the output signal and a reference signal; and processing information associated with the output signal and the reference signal. The method further includes: generating an amplified signal based on at least information associated with the output signal and the reference signal; receiving the current sensing signal and a first signal associated with the amplified signal; processing information associated with the current sensing signal and the first signal; and outputting a comparison signal based on at least information associated with the first signal and the current sensing signal. Furthermore, the method includes: receiving the comparison signal; processing information associated with the comparison signal; and outputting a drive signal based on at least information associated with the comparison signal to close or open the switch to affect the first current. For example, the method is implemented according to at least FIG. 2, FIG. 4, FIG. 5, FIG. 6, and/or FIG. 7.

In yet another embodiment, a method for regulating a power conversion system includes: receiving a first signal and a second signal; processing information associated with the first signal and the second signal; and generating a third signal based on at least information associated with the first signal and the second signal, the first signal being associated with a demagnetization period related to an inductor, the second signal being associated with a first current flowing through the inductor. The method further includes: receiving the third signal; processing information associated with the third signal; outputting a drive signal to the switch to affect the first current; and in response to, the second signal indicating, during a first switching cycle associated with the drive signal, that the first current is equal to or larger than a current threshold and the first signal indicating, during an off-time period of the first switching cycle, that the demagnetization period is smaller than a predetermined time period, changing the third signal from a first signal state to a second signal state to cause the power conversion system to be shut down. For example, the method is implemented according to at least FIG. 5.

For example, some or all components of various embodiments of the present invention each are, individually and/or in combination with at least another component, implemented using one or more software components, one or more hardware components, and/or one or more combinations of software and hardware components. In another example, some or all components of various embodiments of the present invention each are, individually and/or in combination with at least another component, implemented in one or more circuits, such as one or more analog circuits and/or one or more digital circuits. In yet another example, various embodiments and/or examples of the present invention can be combined.

Although specific embodiments of the present invention have been described, it will be understood by those of skill in the art that there are other embodiments that are equivalent to the described embodiments. Accordingly, it is to be understood that the invention is not to be limited by the specific illustrated embodiments, but only by the scope of the appended claims.

What is claimed is:

1. A system controller for regulating a power conversion system, the system controller comprising:
    a detection component configured to receive an input voltage related to a diode connected to an inductor;
    a control logic component coupled to the detection component; and
    a driving component coupled to the control logic component;
    wherein, in response to the input voltage being larger than a predetermined threshold,
        the detection component is further configured to output a first signal at a first logic level;
        the control logic component is configured to generate a modulation signal in response to the first signal being at the first logic level; and
        the driving component is configured to output a drive signal to open and close a switch at a modulation frequency of the modulation signal, so that in response to the switch being closed, the inductor is configured to output a first current through the switch and in response to the switch being open, the inductor is configured to output a second current through the diode;
    wherein, in response to the input voltage being smaller than the predetermined threshold,
        the detection component is further configured to output the first signal at a second logic level, the second logic level being different from the first logic level; and
        the control logic component is further configured to not generate the modulation signal in response to the first signal being at the second logic level.

2. The system controller of claim 1 wherein:
    the diode includes a first diode terminal and a second diode terminal;
    the inductor includes a first inductor terminal and a second inductor terminal;
    the first diode terminal is coupled to the first inductor terminal; and
    the second diode terminal is configured to receive a first voltage related to the input voltage.

3. The system controller of claim 1 wherein the detection component includes:
    an input detector configured to receive the input voltage and output a detection signal based on at least information associated with the input voltage; and
    an enable component configured to receive the detection signal and output the first signal based on at least information associated with the detection signal.

4. The system controller of claim 1 wherein the diode is directly connected to the inductor.

5. The system controller of claim 2 wherein the first voltage is proportional to the input voltage.

6. The system controller of claim 2 wherein the second inductor terminal is coupled to a capacitor.

7. A method for regulating a power conversion system, the method comprising:
    receiving an input voltage related to a diode connected to an inductor;
    processing information associated with the input voltage;
    in response to the input voltage being larger than a predetermined threshold,
        outputting a first signal at a first logic level;
        generating a modulation signal in response to the first signal being at the first logic level; and
        outputting a drive signal to open and close a switch at a modulation frequency of the modulation signal; and
    in response to the input voltage being smaller than the predetermined threshold,
        outputting the first signal at a second logic level, the second logic level being different from the first logic level; and
        not generating the modulation signal in response to the first signal being at the second logic level.

8. The method of claim 7, and further comprising:
    in response to the input voltage being larger than the predetermined threshold,
    in response to the switch being closed, outputting a first current through the switch;
    in response to the switch being open, outputting a second current through the diode.

* * * * *